US011939525B2

United States Patent
Rosales et al.

(10) Patent No.: US 11,939,525 B2
(45) Date of Patent: *Mar. 26, 2024

(54) THERMOCHROMIC METAL HALIDE PEROVSKITE WINDOWS WITH IDEAL TRANSITION TEMPERATURES

(71) Applicant: Alliance for Sustainable Energy, LLC, Golden, CO (US)

(72) Inventors: Bryan Anthony Rosales, Boulder, CO (US); Lance Michael Wheeler, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,505

(22) Filed: Dec. 1, 2022

(65) Prior Publication Data

US 2023/0167355 A1 Jun. 1, 2023

Related U.S. Application Data

(60) Provisional application No. 63/284,725, filed on Dec. 1, 2021.

(51) Int. Cl.
*C09K 9/02* (2006.01)
*C08K 5/19* (2006.01)

(52) U.S. Cl.
CPC ............ *C09K 9/02* (2013.01); *C08K 5/19* (2013.01); *C09K 2211/10* (2013.01)

(58) Field of Classification Search
CPC ......... C09K 9/02; C09K 2211/10; C08K 5/19
See application file for complete search history.

(56) References Cited

U.S. PATENT DOCUMENTS

2017/0089128 A1* 3/2017 Wheeler ................. C03C 4/06
2017/0321117 A1* 11/2017 Weidman ............... C09K 11/06

FOREIGN PATENT DOCUMENTS

WO WO-2019157352 A1 * 8/2019 ........... C01G 21/006

OTHER PUBLICATIONS

Lianfeng Zhao, Ross A. Kerner, Zhengguo Xiao, YunHui L. Lin, Kyung Min Lee, Jeffrey Schwartz, and Barry P. Rand, Redox Chemistry Dominates the Degradation and Decomposition of Metal Halide Perovskite Optoelectronic Devices, ACS Energy Lett. 2016, 1, 595-602. (Year: 2016).*

Hsien-Yi Hsu, Li Ji, Minshu Du, Ji Zhao, † Edward T. Yu, and Allen J. Bard, Optimization of PbI2/MAPbI3 Perovskite Composites by Scanning Electrochemical Microscopy,J. Phys. Chem. C 2016, 120, 19890-19895. (Year: 2016).*

Acik, M. et al., "Substitutional Growth of Methylammonium Lead Iodide Perovskites in Alcohols," Advanced Energy Materials, vol. 8, 2018, 14 pages.

(Continued)

*Primary Examiner* — Bijan Ahvazi
(74) *Attorney, Agent, or Firm* — Michael A. McIntyre

(57) ABSTRACT

The present disclosure relates to a composition that includes a first phase that includes a perovskite and a second phase that includes a salt, a polymer, and a switching molecule, where the first phase and the second phase are in physical contact, and the composition is capable of reversibly switching between a substantially opaque state and a substantially transparent state.

24 Claims, 36 Drawing Sheets

(56) References Cited

OTHER PUBLICATIONS

Cao, J. et al., "Identifying the Molecular Structures of Intermediates for Optimizing the Fabrication of High-Quality Perovskite Films," J. American Chemical Society, vol. 138, 2016, 8 pages.
Dawson, J.A. et al., "Mechanisms of Lithium Intercalation and Conversion Processes in Organic-Inorganic Halide Perovskites," ACS Energy Letters, vol. 2, 2017, 7 pages.
De Bastiani, M. et al., "Thermochromic Perovskite Inks for Reversible Smart Window Applications," Chemistry of Materials, vol. 29, 2017, 4 pages.
Desiraju, G.R., "Hydrogen Bridges in Crystal Engineering: Interactions without Borders," Accounts of Chemical Research, vol. 25, 2002, 9 pages.
Di, D. et al., "Size-Dependent Photon Emission from Organometal Halide Perovskite Nanocrystals Embedded in an Organic Matrix," J. of Physical Chemistry Letters, vol. 6, 2015, 5 pages.
Doroshenko, I. et al., "Infrared Absorption Spectra of Monohydric Alcohols," Hindawi, Dataset Papers in Chemistry, vol. 2013, 2012, 6 pages.
Fateev, S.A. et al., "Solution Processing of Methylammonium Lead Iodide Perovskite from y-butyrolactone: Crysallization Mediated by Solvation Equilibrium," Chemistry of Materials, vol. 30, 2018, 8 pages.
Finkenauer, B. et al., "Mechanically robust and self-healable perovskite solar cells," Cell Reports Physical Science, vol. 2, 2021, 10 pages.
Halder, A. et al., "Exploring Thermochromic Behavior of Hydrated Hybrid Perovskites in Solar Cells," J. of Physical Chemistry Letters, vol. 6, 2015, 5 pages.
Hua, Y. et al., Ethanol induced structure reorganization of 2D layered perovskites (OA)2(MA)n-1PbnI3n+1, Journal of Luminescence, vol. 220, 2020, 6 pages.
Huisman, B.A.H. et al., "Zero-Dimensional Hybrid Organic-Inorganic Lead Halides and Their Post-Synthesis Reversible Transformation into Three-Dimensional Perovskites," Inorganic Chemistry, vol. 60, 2021, 5 pages.
Koutselas, I.B. et al., "Electronic properties of three- and low-dimensional semiconducting materials with Pb halide and Sn halide units," J. Phys. Condens. Matter, vol. 8, 1996, 11 pages.
Lin, J. et al., "Thermochromic halide perovskite solar cells," Nature Materials, vol. 17, 2018, 9 pages.
Liu, C. et al., "Efficient Perovskite Hybrid Photovoltaics via Alcohol-Vapor Annealing Treatment," Advanced Functional Materials, Materials Views, vol. 26, 2016, 10 pages.
Liu, S. et al., "Organic Hybrid Perovskite (MAPbI3-xClx) for Thermochromic Smart Window with Strong Optical Regulation Ability, Low Transition Temperature, and Narrow Hysteresis Width," Advanced Functional Materials, vol. 31, 2021, 12 pages.
Liu, X. et al., "Methanol-induced fast CsBr release results in phse-pure CsPbBr3 perovskite nanoplatelets," RSC Nanoscale Advances, vol. 2, 2020, 7 pages.
Mitzi, D.B. et al., "Intercalated Organic-Inorganic Perovskites Stabilized by Fluoroaryl-Aryl Interactions," Inorganic Chemistry, vol. 41, 2002, 12 pages.

Petrov, A. et al. "Crystal Structure of DMF-Intermediate Phases Uncovers the Link Between CH3NH3PbI3 Morphology and Precursor Stoichiometry," J. of Physical Chemistry C, vol. 121, 2017, 5 pages.
Rosales, B. et al., "Reversible multicolor chromism in layered formamidinium metal halide perovskites," Nature Communications, vol. 11, 2020, 12 pages.
Rosales, B. et al., "Reversible Methanolation of Metal Halide Perovskites," Journal of the American Chemical Society, vol. 144, 2022, 6 pages.
Schuck, G. et al., "Infrared Spectroscopic Study of Vibrational Modes across the Orthorhombic-Tetragonal Phase Transition in Methylammonium Lead Halide Single Crystals," J. of Physical Chemistry C, vol. 122, 2018, 11 pages.
Sharma, S.K. et al., "Reversible Dimensionality Tuning of Hybrid Perovskites with Humidity: Visualization and Application to Stable Solar Cells," Chemistry of Materials, vol. 31, 2019, 7 pages.
Sun, Y. et al., "Long-term stability of organic-inorganic hybrid perovskite solar cells with high efficiency under high humidity conditions," J. Materials Chemistry A, vol. 5, 2017, 7 pages.
Thumo, U. et al., "Zero-dimensional cesium lead halide perovskites: Phase transformations, hybrid structures, and applications," J. Solid State Chemistry, vol. 271, 2019, 17 pages.
Toby, B. et al., "GSAS-II: the genesis of a modern open-source all purpose crystallography software package," J. Applied Crystallography, vol. 26, 2013, 6 pages.
Vincent, B. et al., Alyklammonium lead halides. Part 1. Isolated PbI64-ions in (CH3NH3)4pbl62H20, Can. J. Chem., vol. 65, 1987, 5 pages.
Wallace, V. et al., "Revisiting the Aqueous Solutions of Dimethyl Sulfoxide by Spectroscopy in the Mid-and Near-Infrared: Experiments and Car-Parrinello Simulations," J. of Physical Chemistry B, vol. 119, 2015, 10 pages.
Wheeler, L. et al., "Switchable photovoltaic windows enabled by reversible photothermal complex dissociation from methylammonium lead iodide," Nature Communications, 8:1722, 2017, 9 pages.
Wheeler, L. et al., "Detailed Balance Analysis of Photovoltaic Windows," ACS Energy Letters, vol. 4, 2019, 7 pages.
Yang, F. et al., "Enhanced Crystallization by Methanol Additive in Antisolvent for Achieving High-Quality MAPbI3 Perovskite Films in Humid Atmosphere," ChemSusChem, vol. 11, 2018, 10 pages.
Zhang, F. et al., "Advances in two-dimensional organic-inorganic hybrid perovskites," Energy & Environmental Science, vol. 13, 2020, 33 pages.
Zhang, Y. et al., "Perovskite thermochromic smart window: Advanced optical properties and low transition temperature," Applied Energy, vol. 254, 2019, 12 pages.
Zhao, Y. et al., "A polymer scaffold for self-healing perovskite solar cells," Nature Communications, 7:10228, 2016,9 pages.
Zu, L.-J et al., "0D and 2D: The Cases of Phynylethylammonium Tin Bromide Hybrids," ACS Chemistry of Materials, vol. 32, 2020, 7 pages.
Zuo, L. et al., "Polymer-modified halide perovskite films for efficient and stable planar heterojunction solar cells," Science Advances, 2017, 11 pages.

* cited by examiner

THERMOCHROMIC METAL HALIDE PEROVSKITE WINDOWS WITH IDEAL TRANSITION TEMPERATURES

CROSS-REFERENCE TO RELATED APPLICATIONS

This application claims priority from U.S. Provisional Patent Application No. 63/284,725 filed on Dec. 1, 2021, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Buildings account for over one-third of the world's final energy consumption and approximately 28% of global $CO_2$ emissions, which increases to >40% when building-related construction is included. Urban areas composed of high-rise buildings continue to gain population and are predicted to encompass 70% of the world's population by the middle of this century. At the same time, urban skylines increasingly feature glass façades, and the architectural trend across building sectors is toward more glass, despite it greatly underperforming their opaque cladding counterparts for building efficiency. Therefore, new window technology must be developed and deployed to reconcile the significant impact buildings have on the environment with the architectural demand for more glazing.

For thermochromic materials to be functionally and economically in the marketplace, they need an ideal critical transition temperature ($T_C$), fast transition kinetics, a narrow hysteresis width (defined as the difference between the temperatures needed to switch from bleached to colored and colored to bleached), and high solar modulation ability. Thermochromic materials include liquid crystals and leuco dyes, but vanadium dioxide has been established as the quintessential solid-state thermochromic material for building applications. It has been the focus of research for decades due its relatively low-temperature insulator-to-metal Mott transition. Though low compared to most oxides, 68° C. is well above the ideal $T_C$ for window applications. An ideal $T_C$ has been suggested to range between 10° C. and 28° C. based on various reports in the previous decade that typically study simplified buildings and glazing systems (savings reported relative to single-pane windows) and in single climate locations. Significant research has thus been put into reducing the $T_C$ of VO2 with success in reaching $T_C$<30° C. by using nanostructuring or doping. However, reducing $T_C$ slows the transition kinetics by decreasing the thermodynamic driving force and results in a larger hysteresis width due to the nature of the first-order phase transformation of $VO_2$.

Metal halide perovskite materials are a class of semiconductors that have captured the imagination of the materials science community in the last decade due to their unmatched optoelectronic properties and scalable solution processibility. Most research has centered on photovoltaics due to their extraordinarily absorption coefficients in the visible and near infrared regions of the solar spectrum. The inherently low formation energy of perovskites enables rapid transformation from the highly absorbing phase to highly transparent ones, which leads to unmatched solar modulation ability. State transformation is induced using intercalation, crystal phase transformation, and nanoparticle precipitation. Each mechanism has now been leveraged to produce thermochromic windows. Perhaps the most interesting feature of perovskites as thermochromic materials is the opportunity to combine chromism with photovoltaic energy generation to bypass the fundamental tradeoff between visible transmittance of a photovoltaic window and power generation. However, ideal transition temperatures for perovskite-based thermochromic windows are yet to be demonstrated. Thus, there remains a need for improved perovskite-containing compositions, device architectures, and stacks for thermochromic window applications.

SUMMARY

An aspect of the present disclosure is a composition that includes a first phase that includes a perovskite and a second phase that includes a salt, a polymer, and a switching molecule, where the first phase and the second phase are in physical contact, and the composition is capable of reversibly switching between a substantially opaque state and a substantially transparent state. When in the opaque state, the perovskite is an opaque perovskite comprising a three-dimensional (3D) perovskite, when in the transparent state, the perovskite is a transparent perovskite comprising a zero-dimensional (0D) perovskite that is in a complex with the switching molecule, and the first phase switches between the opaque state and transparent state when the composition transitions through a critical temperature, $T_C$, between about 20° C. and about 95° C. In some embodiments of the present disclosure, $T_c$ may be between about 20° C. and about 75° C. In some embodiments of the present disclosure, $T_c$ may be between about 20° C. and about 25° C.

In some embodiments of the present disclosure, the switching molecule may include at least one of water, methanol, ethanol, propanol, and/or butanol. In some embodiments of the present disclosure, the switching molecule may include at least one of water and/or methanol. In some embodiments of the present disclosure, the opaque perovskite may include $ABX_3$, where A includes a first cation, B includes a second cation, and X includes a first anion. In some embodiments of the present disclosure, the transparent perovskite may include A, B, and X at a ratio of AX to BX that is greater than 1.0. In some embodiments of the present disclosure, the transparent perovskite may include at least one of $A_6BX_8$ and/or $A_4BX_6$. In some embodiments of the present disclosure, the transparent perovskite may further include at least one of $A_6BX_8 \cdot 2MeOH$ and/or $A_4BX_6 \cdot 2H_2O$.

In some embodiments of the present disclosure, A may include at least one of methyl ammonium, formamidinium, or cesium. In some embodiments of the present disclosure, B may include at least one of lead, tin, germanium, and/or a transition metal. In some embodiments of the present disclosure, X may include a halide. In some embodiments of the present disclosure, the salt may include at least one of AX or AX', where X' includes a second anion.

In some embodiments of the present disclosure, the polymer may include at least one of carbon, hydrogen, and/or oxygen. In some embodiments of the present disclosure, the polymer may include at least one of an ether linkage, a ketone linkage, an amide linkage, a hydroxyl group, and/or a carboxylic acid group. In some embodiments of the present disclosure, the polymer may include at least one of poly (ethylene glycol) (PEG), poly(vinyl alcohol) (PVA), polyacrylic acid (PAA), and/or polyethyleneimine. In some embodiments of the present disclosure, the polymer may be present at a concentration between about 0.1 wt % and about 50 wt % relative to the transparent perovskite.

In some embodiments of the present disclosure, the composition may further include a plurality of pores that are present within the first phase in the opaque state and substantially absent in the translucent state. In some embodiments of the present disclosure, the pores may be present at a concentration between about 0.1 vol % and about 70 vol % relative to the opaque perovskite. In some embodiments of the present disclosure, the perovskite may be in the form of a plurality of grains separated by a plurality of grain boundaries, where at least a portion of the polymer is positioned at least one of adjacent to the pores or within the pores while in the opaque state, and at least a portion of the polymer is positioned at least one of adjacent to the grain boundaries or within the grain boundaries while in the transparent state.

In some embodiments of the present disclosure, the opaque perovskite may include $MAPbI_3$. In some embodiments of the present disclosure, the transparent perovskite may include at least one of $MA_6PbI_8$ and/or $MA_4PbI_6$. In some embodiments of the present disclosure, the transparent perovskite may further include at least one of $MA_6PbI_8 \cdot 2MeOH$ and/or $MA_4PbI_6 \cdot 2H_2O$. In some embodiments of the present disclosure, the salt may include at least one of MAX, MAX', FAX, FAX', CsX, or CsX'.

BRIEF DESCRIPTION OF THE DRAWINGS

Some embodiments are illustrated in referenced figures of the drawings. It is intended that the embodiments and figures disclosed herein are to be considered illustrative rather than limiting.

REFERENCE NUMBERS

Figure 1A:
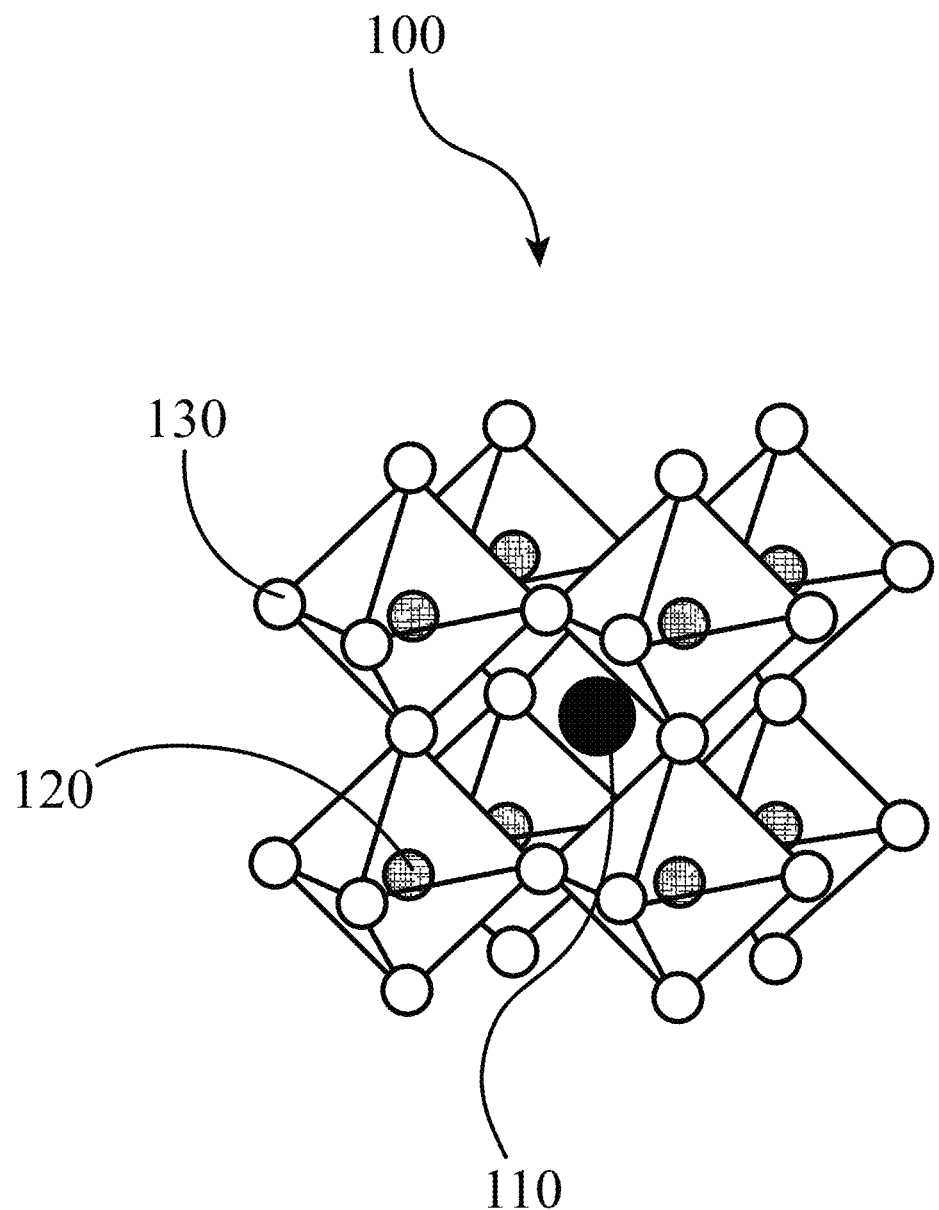
FIGS. 1A and 1B illustrate a perovskite in a corner-sharing, cubic phase arrangement, according to some embodiments of the present disclosure.

100 ... perovskite
110 ... A-cation
120 ... B-cation
130 ... X-anion
400 ... composite composition
400A ... colored state (i.e., opaque)
400B ... bleached state (i.e., transparent)
430 ... first phase 440 . . . second phase
450 . . . third phase
460 . . . pore

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure describes a mesoscopic building energy model that demonstrates reduced building energy consumption when thermochromic windows are employed. Savings are realized across eight disparate climate zones of the United States. This model was then used to determine the ideal critical transition temperature between about 20° C. and about 27.5° C., inclusively, for thermochromic windows based on metal halide perovskite materials. Similar transition temperatures were then achieved experimentally using composite compositions that included metal halide perovskites, methanol and/or water as an intercalating switching molecule, excess salt (e.g., excess methylammonium iodide (MAI) with our without additional methylammonium chloride (MACl)), and a polymer positioned in a different phase, referred to herein as a second phase, with the perovskite (in at least one of a 3D, 2D, 1D, or 0D form) making up a first phase, where each phase occupies a separate and distinct volume within the composite composition. As shown herein, each component (switching molecule, excess salt, and polymer) tailors hydrogen bonding in the composite perovskite composition to significantly reduce the activation energy needed for the colored-to-bleached transition, thereby reducing the critical transition temperature, $T_C$, at which the transition occurs. Therefore, the composite compositions, and the resultant thermochromic windows based on metal halide perovskites described herein represent a clear opportunity to mitigate the effects of energy-consuming buildings. More details on the different phases contained in these composite compositions are provided below.

Figure 1B:
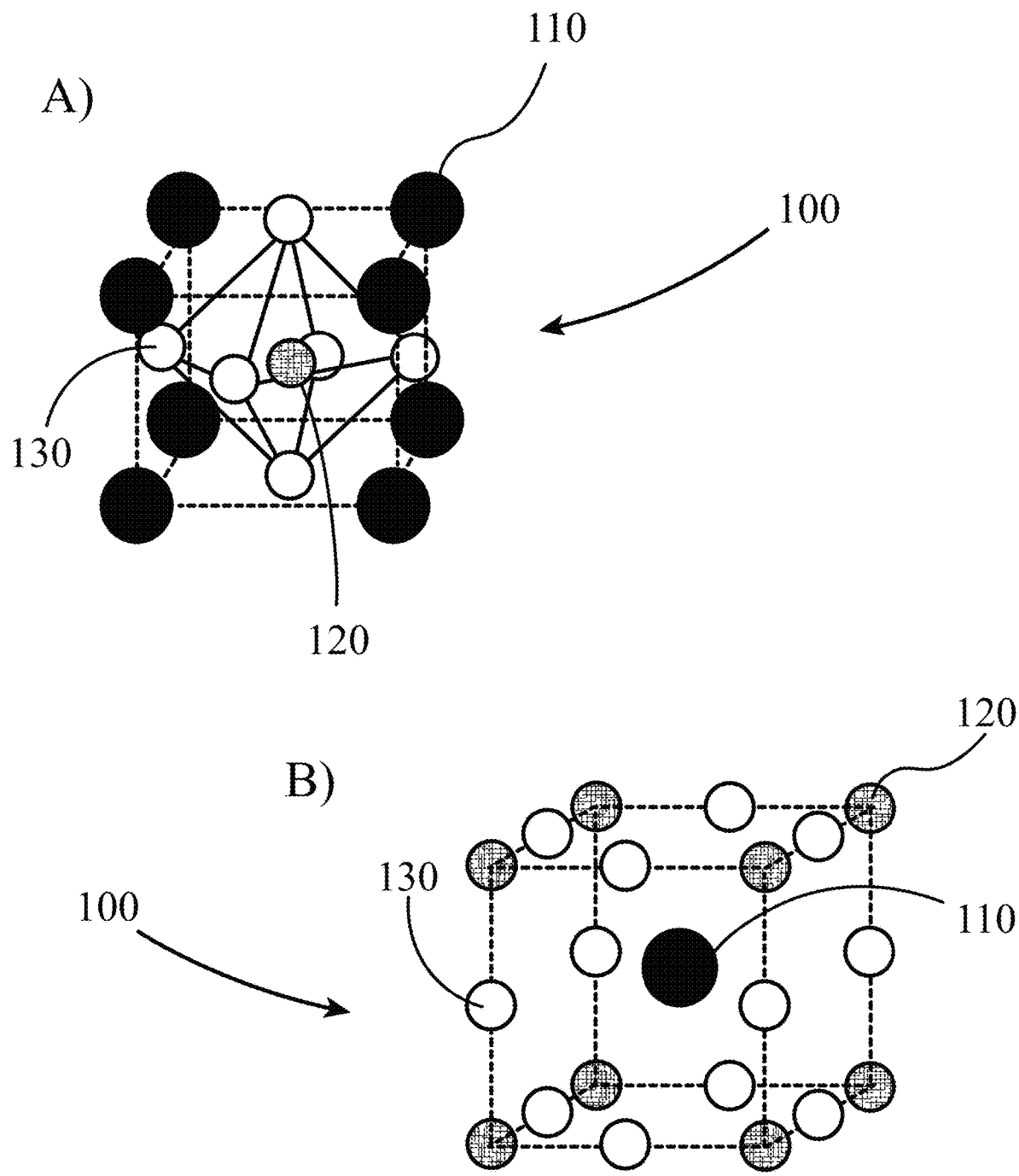

As defined herein, the term "perovskite" refers to compositions having a network of corner-sharing $BX_6$ octahedra resulting in the general stoichiometry of $ABX_3$. FIGS. 1A and 1B illustrate that perovskites 100, for example metal halide perovskites, may organize into a three-dimensional (3D) cubic crystalline structures (i.e., α-phase or α-$ABX_3$) constructed of a plurality of corner-sharing $BX_6$ octahedra. In the general stoichiometry for a perovskite, $ABX_3$, X (130) is an anion and A (110) and B (120) are cations, typically of different sizes. FIG. 1A illustrates that a perovskite 100 having an α-phase structure may be further characterized by eight $BX_6$ octahedra surrounding a central A-cation 110, where each octahedra is formed by six X-anions 130 surrounding a central B-cation 120 and each of the octahedra are linked together by "corner-sharing" of anions, X (130).

Panel A of FIG. 1B provides another visualization of a perovskite 100 in the α-phase, also referred to as the cubic phase. This is because, as shown in FIG. 1B, a perovskite in the α-phase may be visualized as a cubic unit cell, where the B-cation 120 is positioned at the center of the cube, an A-cation 110 is positioned at each corner of the cube, and an X-anion 130 is face-centered on each face of the cube. Panel B of FIG. 1B provides another visualization of the cubic unit cell of an α-phase perovskite, where the B-cation 120 resides at the eight corners of a cube, while the A-cation 110 is located at the center of the cube and with 12 X-anions 130 centrally located between B-cations 120 along each edge of the unit cell. For both unit cells illustrated in FIG. 1B, the A-cations 110, the B-cations 120, and the X-anions 130 balance to the general formula $ABX_3$ of a perovskite, after accounting for the fractions of each atom shared with neighboring unit cells. For example, referring to Panel A of FIG. 1B, the single B-cation 120 atom is not shared with any of the neighboring unit cells. However, each of the six X-anions 130 is shared between two unit cells, and each of the eight A-cations 110 is shared between eight unit cells. So, for the unit cell shown in Panel A of FIG. 1B, the stoichiometry simplifies to B=1, A=8*0.125=1, and X=6*0.5=3, or $ABX_3$. Similarly, referring again to Panel B of FIG. 1B, since the A-cation is centrally positioned, it is not shared with any of the unit cells neighbors. However, each of the 12 X-anions 130 is shared between four neighboring unit cells, and each of the eight B-cations 120 is shared between eight neighboring unit cells, resulting in A=1, B=8*0.125=1, and X=12*0.25=3, or $ABX_3$. Referring again to Panel B of FIG. 1B, the X-anions 130 and the B-cations 120 of a perovskite in the α-phase are aligned along an axis; e.g., where the angle at the X-anion 130 between two neighboring B-cations 120 is exactly 180 degrees, referred to herein as the tilt angle. However, as shown in FIG. 2A, a perovskite 100 may assume other corner-sharing crystalline phases having tilt angles not equal to 180 degrees.

Figure 2A:
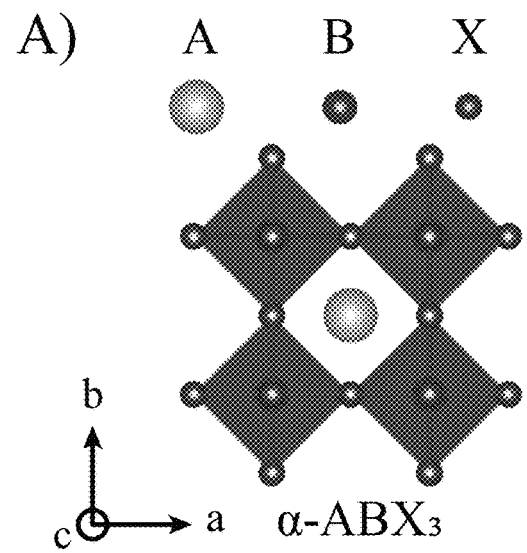
FIG. 2A illustrates three possible corner-sharing phases for perovskites, Panel A) cubic phase (i.e., $\alpha$-$ABX_3$), Panel B) a tetragonal crystalline phase (i.e., $\beta$-$ABX_3$), and Panel C) an orthorhombic crystalline phase (i.e., $\gamma$-$ABX_3$), according to some embodiments of the present disclosure.
Figure 2A:
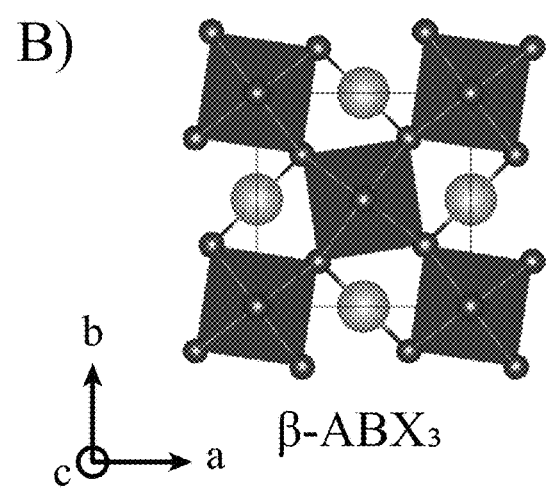
Figure 2A:
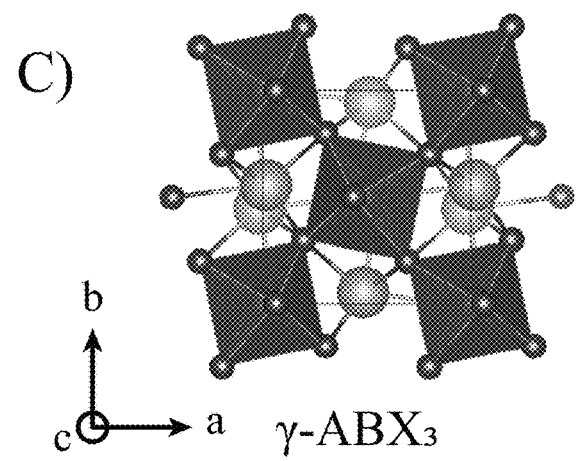

FIG. 2A illustrates that a perovskite can assume other crystalline forms while still maintaining the criteria of an $ABX_3$ stoichiometry with neighboring $BX_6$ octahedra maintaining X anion (130) corner-sharing. Thus, in addition to α-$ABX_3$ perovskites (in the cubic phase) having a tilt angle of 180 degrees, shown in Panel A of FIG. 2A, a perovskite may also assume a tetragonal crystalline phase (i.e., β-$ABX_3$) (see Panel B of FIG. 2A) and/or an orthorhombic crystalline phase (i.e., γ-$ABX_3$) (see Panel C of FIG. 2A), where the adjacent octahedra are tilted relative to the reference axes a, b, and c.

Figure 2B:
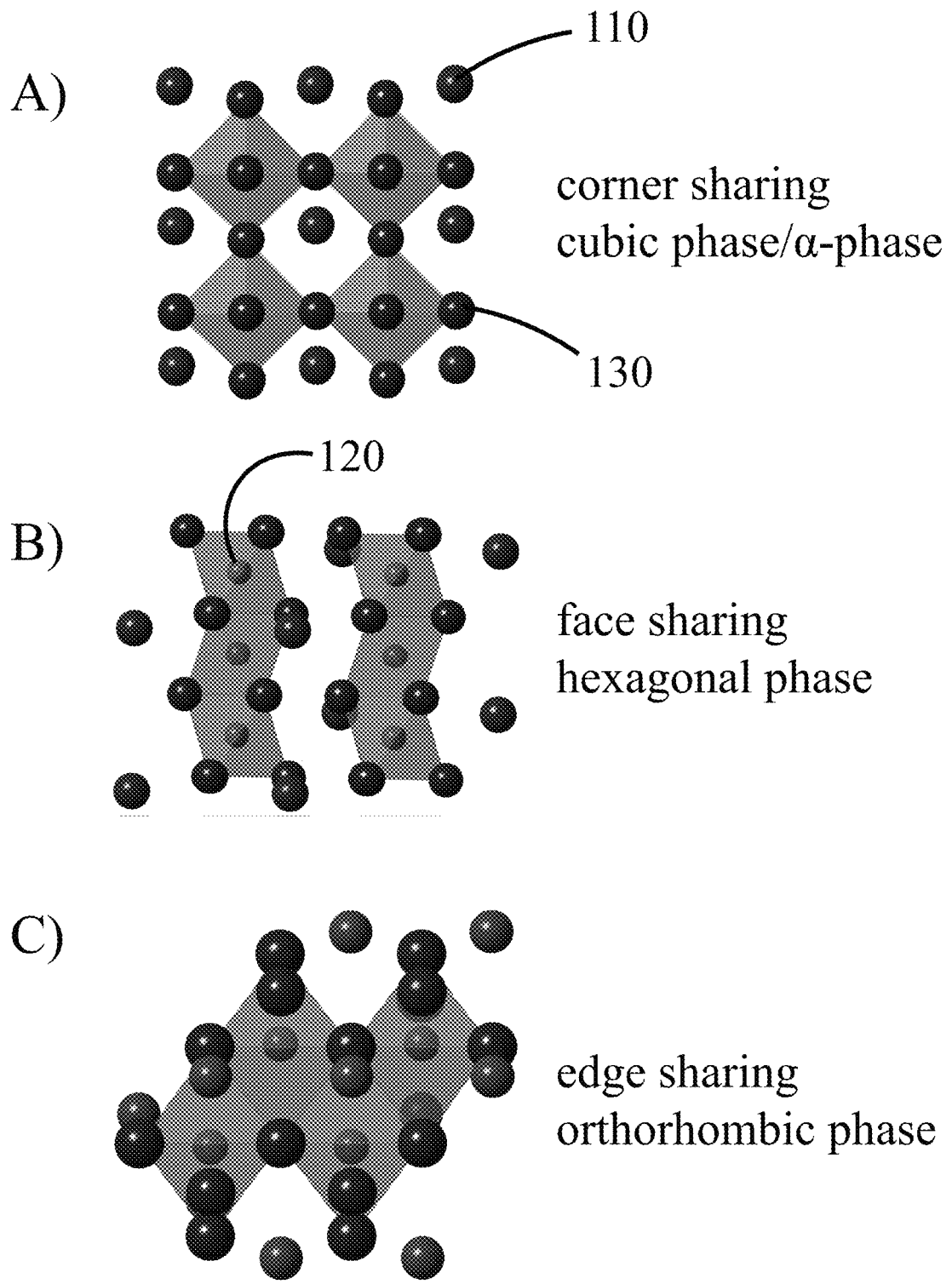
FIG. 2B illustrates a perovskite in one of the three possible phases, the cubic phase (i.e., $\alpha$-phase), compared to two non-perovskite phases (i.e., non-corner sharing), according to some embodiments of the present disclosure.

FIG. 2B illustrates that the elements used to construct a perovskite, as described above, A-cations 110, B-cations 120, and X-anions 130, may result in 3D non-perovskite structures; i.e., structures where neighboring $BX_6$ octahedra are not X-anion 130 corner-sharing and/or do not have a unit structure that simplifies to the $ABX_3$ stoichiometry. Referring to FIG. 2B, Panel A illustrates a perovskite in the cubic phase, i.e., α-$ABX_3$, compared to a non-perovskite structure constructed of face-sharing $BX_6$ octahedra resulting in a hexagonal crystalline structure (see Panel B of FIG. 2B) and a non-perovskite structure constructed of edge-sharing $BX_6$ octahedra resulting in an orthorhombic crystalline structure (see Panel C of FIG. 2B).

Figure 3:
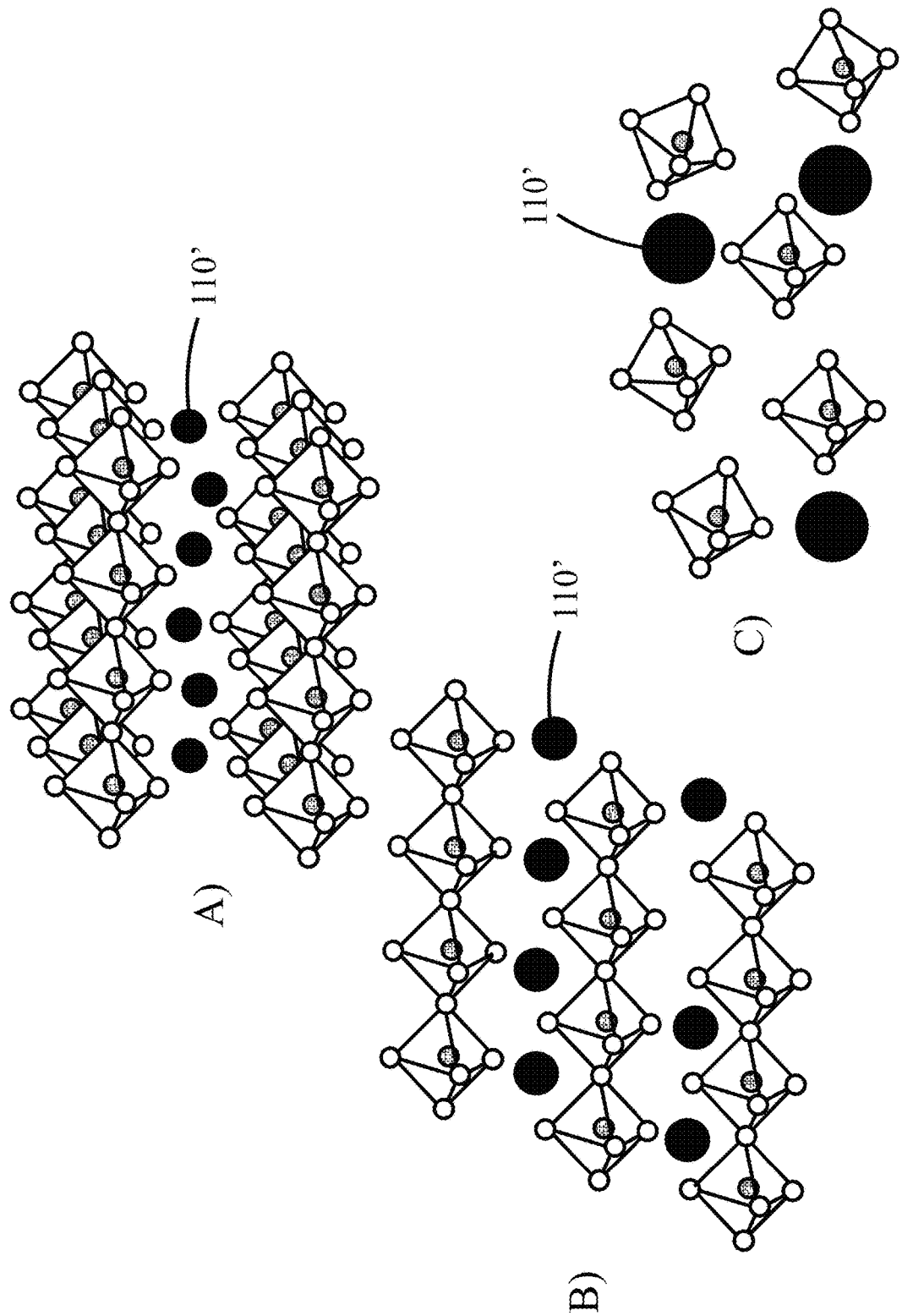
FIG. 3 illustrates 2D, 1D, and 0D perovskite-like structures, in Panels A, B, and C, respectively, according to some embodiments of the present disclosure.

Further, referring now to FIG. 3, the elements used to construct a perovskite, as described above, A-cations 110, B-cations 120, and X-anions 130, may result in non-3D (i.e., lower dimensional structures) perovskite-like structures such as two-dimensional (2D) structures, one-dimensional (1D) structures, and/or zero-dimensional (0D) structures. As shown in FIG. 3, such lower dimensional, perovskite-like structures still include the $BX_6$ octahedra, and depending on the dimensionality, e.g., 2D or 1D, may still maintain a degree of X-anion corner-sharing. However, as shown in FIG. 3, the X-anion 130 corner-sharing connectivity of neighboring octahedra of such lower dimensional structures, i.e., 2D, 1D, and 0D, is disrupted by intervening A-cations 110. Such a disruption of the neighboring octahedra, can be achieved by, among other things, varying the size of the intervening A-cations 110.

Referring to Panel A of FIG. 3, a 3D perovskite may be transformed to a 2D perovskite-like structure, 1D perovskite-like structure, and/or 0D perovskite-like structure. Where the degree of X-anion 130 corner sharing decreases and the stoichiometry changes according to the formula $(A')_m(A)_{n-1}B_nX_{3n+1}$, where monovalent (m=2) or divalent (m=1) A' cations 110' can intercalate between the X-anions of 2D perovskite-like sheets. Referring to Panel B of FIG. 3, 1D perovskite-like structures are constructed by $BX_6$ octahedral chained segments spatially isolated from each other by surrounding bulky organic A'-cations 110', leading to bulk assemblies of paralleled octahedral chains. Referring to Panel C of FIG. 3, typically, the 0D perovskite-like structures are constructed of isolated inorganic octahedral clusters and surrounded by small A'-cations 110', which may be connected via hydrogen bonding. In general, as n approaches infinity the structure is a pure 3D perovskite and when n is equal to 1, the structure is a pure 2D perovskite-like structure. More specifically, when n is greater than 10 the structure is considered to be essentially a 3D perovskite material and when n is between 1 and 5, inclusively, the structure is considered substantially a 2D perovskite-like material.

For simplification, as used herein the term "perovskite" will refer to each of the structures illustrated in FIGS. 1A through 3, unless specified otherwise. Thus, unless specified otherwise, the term "perovskite" as used herein includes each of a true corner-sharing $ABX_3$ perovskite, as illustrated in FIGS. 1A-1B and Panel a) of FIG. 2A, as well as perovskite-like compositions having 0D, 1D, and/or 2D structures like those shown in FIG. 3.

In some embodiments of the present invention, the A-cation 110 may include a nitrogen-containing organic compound such as an alkyl ammonium compound. The B-cation 120 may include a metal and the X-anion 130 may include a halogen. Additional examples for the A-cation 110 include organic cations and/or inorganic cations, for example Cs, Rb, K, Na, Li, and/or Fr. Organic A-cations 110 may be an alkyl ammonium cation, for example a $C_{1-20}$ alkyl ammonium cation, a $C_{1-6}$ alkyl ammonium cation, a $C_{2-6}$ alkyl ammonium cation, a $C_{1-5}$ alkyl ammonium cation, a $C_{1-4}$ alkyl ammonium cation, a $C_{1-3}$ alkyl ammonium cation, a $C_{1-2}$ alkyl ammonium cation, and/or a $C_1$ alkyl ammonium cation. Further examples of organic A-cations 110 include methylammonium ($CH_3NH_3^+$), ethylammonium ($CH_3CH_2NH_3^+$), propylammonium ($CH_3CH_2 CH_2NH_3^+$), butylammonium ($CH_3CH_2 CH_2 CH_2NH_3^+$), formamidinium ($NH_2CH=NH_2^+$), hydrazinium, acetylammonium, dimethylammonium, imidazolium, guanidinium, benzylammonium, phenethylammonium, butylammonium and/or any other suitable nitrogen-containing or organic compound. In other examples, an A-cation 110 may include an alkylamine. Thus, an A-cation 110 may include an organic component with one or more amine groups. For example, an A-cation 110 may be an alkyl diamine halide such as formamidinium ($CH(NH_2)_2$). Thus, the A-cation 110 may include an organic constituent in combination with a nitrogen constituent. In some cases, the organic constituent may be an alkyl group such as straight-chain or branched saturated hydrocarbon group having from 1 to 20 carbon atoms. In some embodiments, an alkyl group may have from 1 to 6 carbon atoms. Examples of alkyl groups include methyl ($C_1$), ethyl ($C_2$), n-propyl ($C_3$), isopropyl ($C_3$), n-butyl ($C_4$), tert-butyl ($C_4$), sec-butyl ($C_4$), iso-butyl ($C_4$), n-pentyl ($C_5$), 3-pentanyl ($C_5$), amyl ($C_5$), neopentyl ($C_5$), 3-methyl-2-butanyl ($C_5$), tertiary amyl ($C_5$), and n-hexyl ($C_6$). Additional examples of alkyl groups include n-heptyl ($C_7$), n-octyl ($C_5$) and the like.

Examples of metal B-cations 120 include, for example, lead, tin, germanium, and or any other 2+ valence state metal that can charge-balance the perovskite 100. Further examples include transition metals in the 2+ state such as Mn, Mg, Zn, Cd, and/or lanthanides such as Eu. B-cations may also include elements in the 3+ valence state, as described below, including for example, Bi, La, and/or Y. Examples for X-anions 130 include halogens: e.g., fluorine, chlorine, bromine, iodine and/or astatine. In some cases, the perovskite halide may include more than one X-anion 130, for example pairs of halogens; chlorine and iodine, bromine and iodine, and/or any other suitable pairing of halogens. In other cases, the perovskite 100 may include two or more halogens of fluorine, chlorine, bromine, iodine, and/or astatine.

Thus, the A-cation 110, the B-cation 120, and X-anion 130 may be selected within the general formula of $ABX_3$ to produce a wide variety of perovskites 100, including, for example, methylammonium lead triiodide ($CH_3NH_3PbI_3$), and mixed halide perovskites such as $CH_3NH_3PbI_{3-x}Cl_x$ and $CH_3NH_3PbI_{3-x}Br_x$. Thus, a perovskite 100 may have more than one halogen element, where the various halogen elements are present in non-integer quantities; e.g., x is not equal to 1, 2, or 3. In addition, perovskite halides, like other organic-inorganic perovskites, can form three-dimensional (3-D), two-dimensional (2-D), one-dimensional (1-D) or zero-dimensional (0-D) networks, possessing the same unit structure. As described herein, the A-cation 110 of a perovskite 100, may include one or more A-cations, for example, one or more of cesium, FA, MA, etc. Similarly, the B-cation 120 of a perovskite 100, may include one or more B-cations, for example, one or more of lead, tin, germanium, etc. Similarly, the X-anion 130 of a perovskite 100 may include one or more anions, for example, one or more halogens (e.g., at least one of I, Br, Cl, and/or F), thiocyanate, and/or sulfur. Any combination is possible provided that the charges balance.

For example, a perovskite having the basic crystal structure illustrated in FIGS. 1A and 1B, in at least one of a cubic, orthorhombic, and/or tetragonal structure, may have other compositions resulting from the combination of the cations having various valence states in addition to the 2+ state and/or 1+ state described above for lead and alkyl ammonium cations; e.g., compositions other than $AB^{2+}X_3$ (where A is one or more cations, or for a mixed perovskite where A is two or more cations). Thus, the methods described herein may be utilized to create novel mixed cation materials having the composition of a double perovskite (elpasolites), $A_2B^{1+}B^{3+}X_6$, with an example of such a composition being $Cs_2BiAgCl_6$ and $Cs_2CuBiI_6$. Another example of a composition covered within the scope of the present disclosure is described by $A_2B^{4+}X_6$, for example $Cs_2PbI_6$ and $Cs_2SnI_6$. Yet another example is described by $A_3B_2^{3+}X_9$, for example $Cs_3Sb_2I_9$. For each of these examples, A is one or more cations, or for a mixed perovskite, A is two or more cations.

As described herein, unique composite compositions are described that include a perovskite phase, i.e., first phase, and a second phase that were formulated and synthesized to yield switchable thermochromic films having, among other things, a very low critical transition temperatures ($T_C$), the approximate temperature or temperature range at which the perovskite phase switches from a substantially transparent state to a substantially opaque state. In some embodiments of the present disclosure, such composite compositions may include the perovskite phase (i.e., first phase), a switching molecule (i.e., intercalant, intercalating molecule), an AX salt (i.e., A-site cation/X-anion salt) not present as part of the perovskite crystal structure, referred to herein as "excess salt" (e.g., MAI or MAI and MACl), and a polymer. As described in more detail below at the AX salt and the polymer may be present in the composite composition as a second phase. In some embodiments of the present disclosure, such a second phase may also include a quantity of the switching molecule.

Figure 4A:
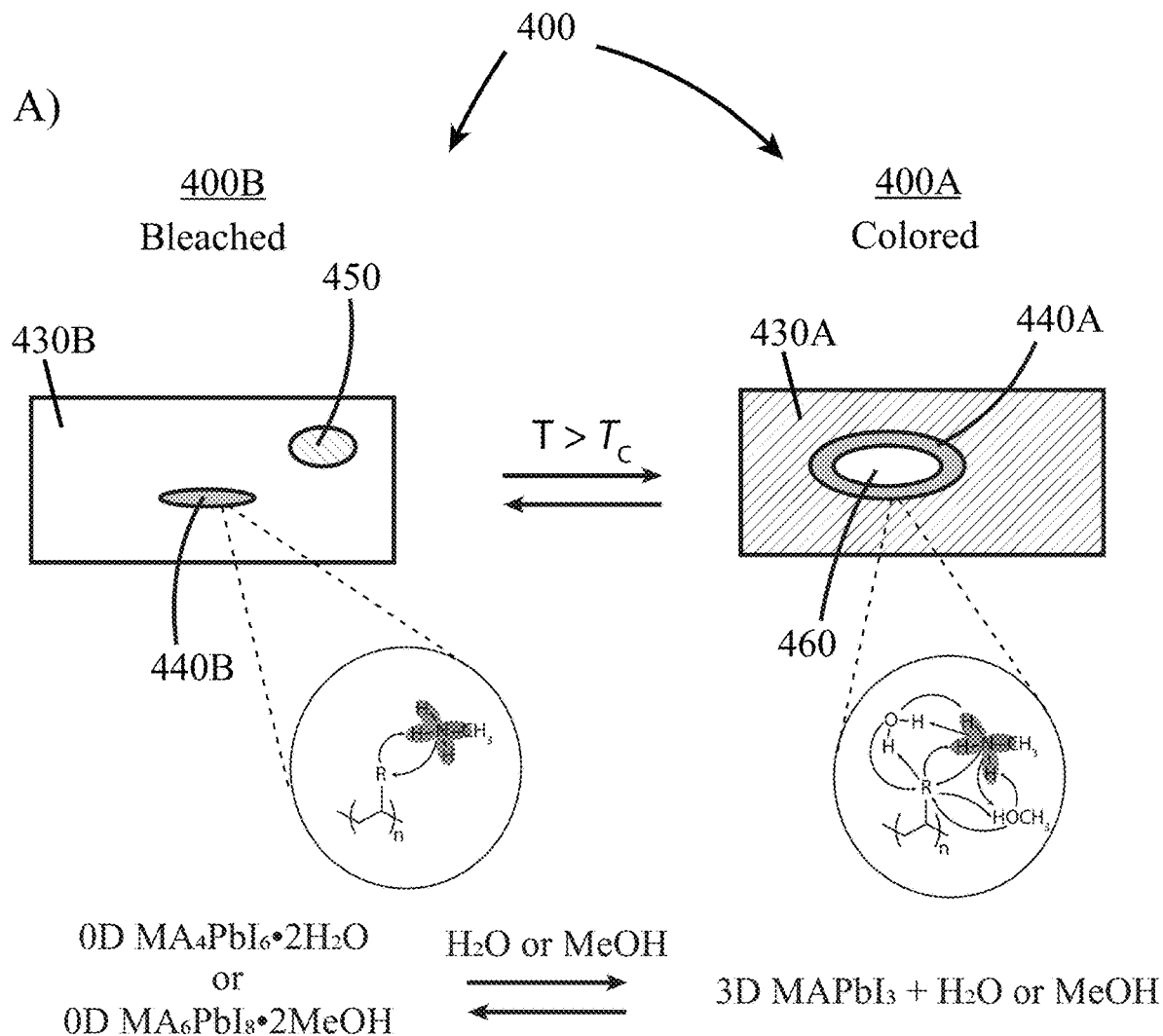
FIG. 4A illustrates aspects of the present invention, according to some embodiments of the present disclosure: Panel A) illustrates a graphical representation of a thermochromic perovskite films containing a polymer in the colored and bleached states with insets illustrating the general molecular interactions present in both states. Panel B) illustrates exemplary polymers, according to some embodiments of the present disclosure.
Figure 4B:
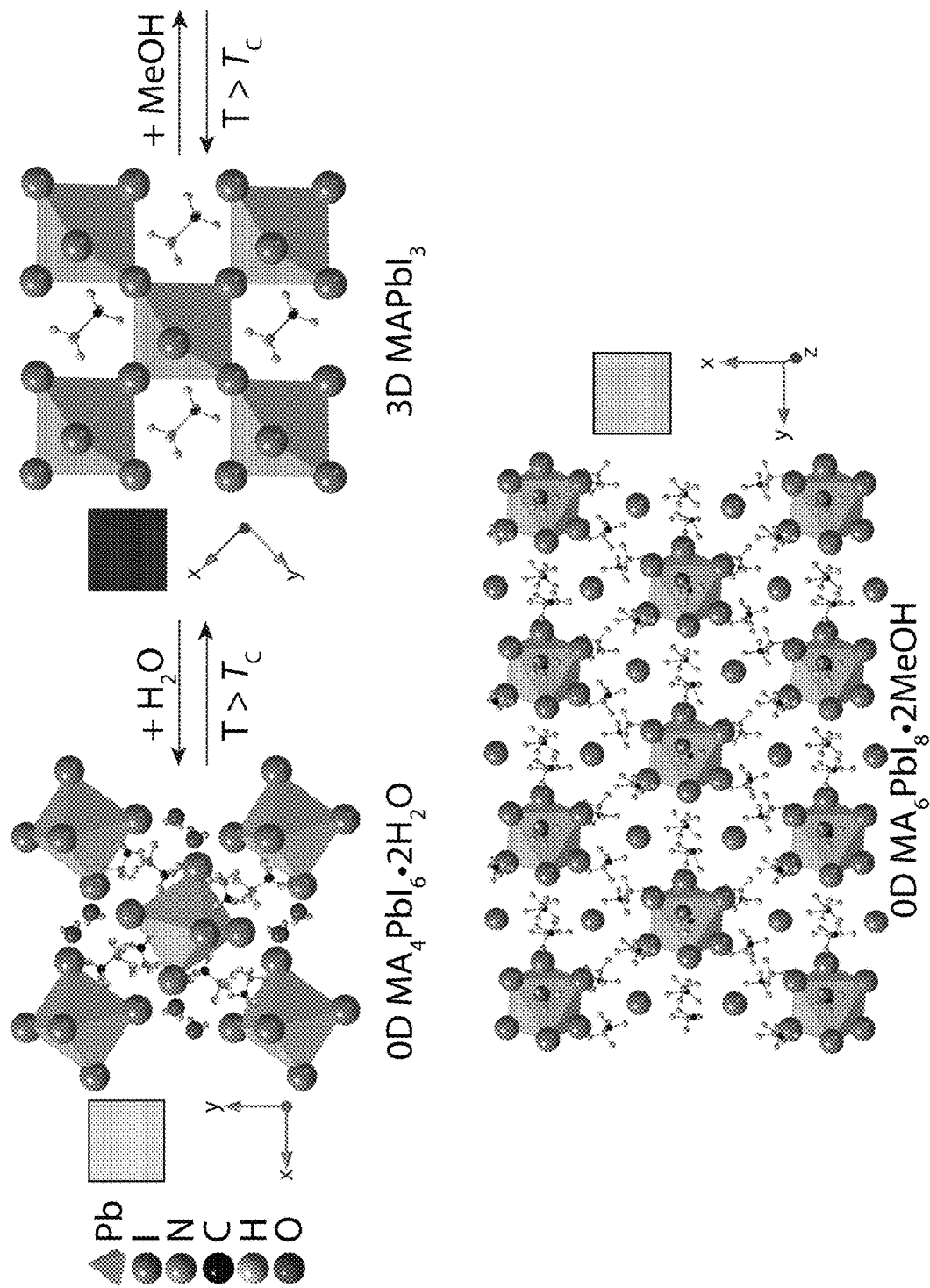
FIG. 4B illustrates a graphical illustration comparing the crystal structures of composite perovskite films in the colored phase and upon exposure to $H_2O$ and MeOH, according to some embodiments of the present disclosure. Square insets in are representative photographs comparing the grayscale intensity of each phase. The corresponding colors were approximately, tan, black, and beige, respectively, from top left, to top right, to bottom.

Because of the importance of the transition temperature, $T_C$, the impact of various compositions on $T_C$ were investigated by formulating composite perovskite-based composites that incorporated excess salt (e.g., MACl) and polymer(s) (see Panel A) of FIG. 4A). The impact of the various polymers on $T_C$ were investigated, including poly (ethylene glycol) (PEG), poly(vinyl alcohol) (PVA), polyacrylic acid (PAA), and polyethyleneimine. Each of these polymers has one or more distinct functional groups that can interact with components of the perovskite-containing compositions described herein (see Panel B) of FIG. 4A). Reversible switching of the composite perovskite-containing compositions between a substantially opaque state and a substantially transparent state was enabled by reversible hydration or methanolation (i.e., reversible intercalation/decalation of switching molecules water or methanol into the perovskite structure, respectively) to transform the three-dimensionally perovskite phase of the colored state into a bleached state (i.e., transparent) characterized by isolated $[PbI_6]^{4-}$ groups surrounded by excess methylammonium halide (MAX, where X=I⁻ or Cl⁻) and water or methanol (see FIG. 4B). Thermochromic composite perovskite-containing films were fabricated by spin-coating a solution of at a ratio of about 4:1 $MAI:PbI_2$ in N,N-dimethylformamide (DMF) onto glass, followed by annealing at about 100° C. for about 10 minutes under inert conditions. Films containing excess salt (e.g., MACl) were fabricated by spin-coating a solution 6.5:1 $MAI:PbCl_2$ in DMF onto glass followed by annealing at 100° C. for about 1 hour under inert conditions. Polymers were incorporated into the perovskite composite films by adding about one molar equivalent of the polymer (relative to the stoichiometric amount of $BX_2$ used to synthesize the perovskite) with respect to its monomer into the solutions described above.

Panel A) of FIG. 4A illustrates a composite composition 400 in both a colored state 400A and a bleached state 400B, according to some embodiments of the present disclosure. Both the colored state 400A and the bleached state 400B of the composite composition 400 may include a first phase 430 and a second phase 440. In some embodiments of the present disclosure, the first phase 430B and the second phase 440B may be at least partially in physical contact with each other. The first phase 430 may include a perovskite and the second phase 440 that may include some combination of the switching molecule (e.g., water or methanol), an A-site/X-anion salt (e.g., MAI and/or MACl), and a polymer. A second phase 440 may be present in a composite composition 400, whether the composition is in a colored state 400A or in a bleached state 400B. In addition, as described in detail herein, a composite composition 400 may include a third phase 450, dispersed within the first phase 430 (perovskite-containing phase), and one or more pores 460, also dispersed within the perovskite-containing first phase 430.

Referring again to Panel A) of FIG. 4A, when the composite composition is in the bleached phase 400B, the perovskite of the perovskite-containing first phase 430B may be substantially a 0D perovskite in either a hydrated form, when using water as a switching molecule, or a methanolated form when using methanol as a switching molecule. For the example of MA as the A-site cation, lead as the B-site cation, and iodide as the X-anion, the 0D compositions corresponding to the perovskite in the bleached state, using water or methanol as the switching molecule, are $MA_4PbI_6 \cdot 2H_2O$ and $MA_6PbI_8 \cdot 2MeOH$, respectively. When the composite composition 400 is switched to its colored state 400A, the 0D perovskite switches to the 3D crystalline state, for this example, $MAPbI_3$. In addition, as described herein, a third phase 450, may be present dispersed within the perovskite-containing phase 430B, according to some embodiments of the present disclosure. As shown in FIG. 4A, this third phase 450 may be substantially, if not completely, reincorporated into the perovskite-containing phase 430A when the composite composition 400 is switched from the bleached state 400B to the colored state 400A. In some embodiments of the present disclosure, a colored perovskite-containing first phase 430A may contain some amount of the third phase 450, but the amount will be less than the amount of third phase 450 present in the bleached perovskite-containing first phase 430B.

Referring again to Panel A) of FIG. 4A, a composite composition 400 may also include one or more pores 460 dispersed within the perovskite-containing first phase 430.

These pores 460 may be most significantly present when the perovskite-containing first phase 430 is in the colored/opaque state. Thus, a pore 460 may be positioned in a colored first phase 430A. Further, the second phase 440A may be positioned between the pore 460 and the second phase 440A. In some embodiments of the present disclosure, a bleached perovskite-containing first phase 430B may contain some quantity of pores 460, but the amount will be less than the amount of pores 460 present in the colored perovskite-containing first phase 430A.

In summary, when in the bleached state, a composite composition 400B may contain a first perovskite-containing phase 430B that includes a 0D perovskite in a complex with the switching molecule, a second phase 440B containing a salt, a polymer, and a switching molecule, and third phase 450. Each of these are describe in more detail below. When in the colored state, a composite composition 400A may contain a first perovskite-containing phase 430A that includes 3D perovskite substantially absent of the switching molecule, a second phase 440A containing a salt, a polymer, and the switching molecule, and a pore.

Figure 4C:
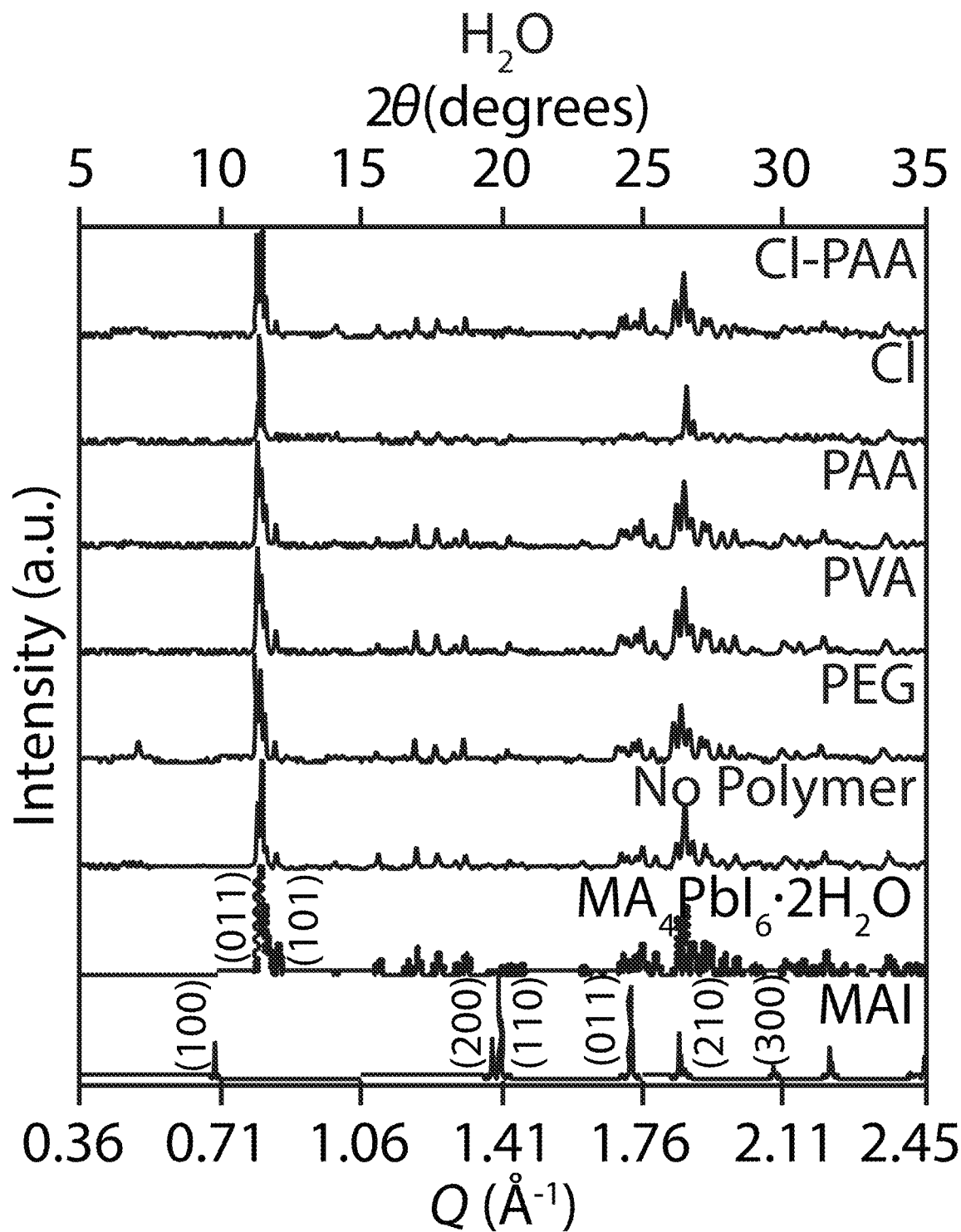
FIGS. 4C-E illustrate select wide-angle X-ray scattering (WAXS) data extracted from in-situ cycling of thermochromic perovskite films alternatively exposed to $H_2O$/MeOH and 75° C., from FIG. 13A-13F, according to some embodiments of the present disclosure. Data were obtained from the last WAXS image of the first (FIG. 4C) $H_2O$, (FIG. 4D) heating, and (FIG. 4E) MeOH cycle. Gray bars in (FIG. 4E) indicate the additional phase associated with methanolation. The 2θ axes are relative to Cu Kα (1.5406 Å, 8.04 eV) radiation and were calculated from $Q=4\pi \sin(\theta)/\lambda$ where is the excitation wavelength.
Figure 4D:
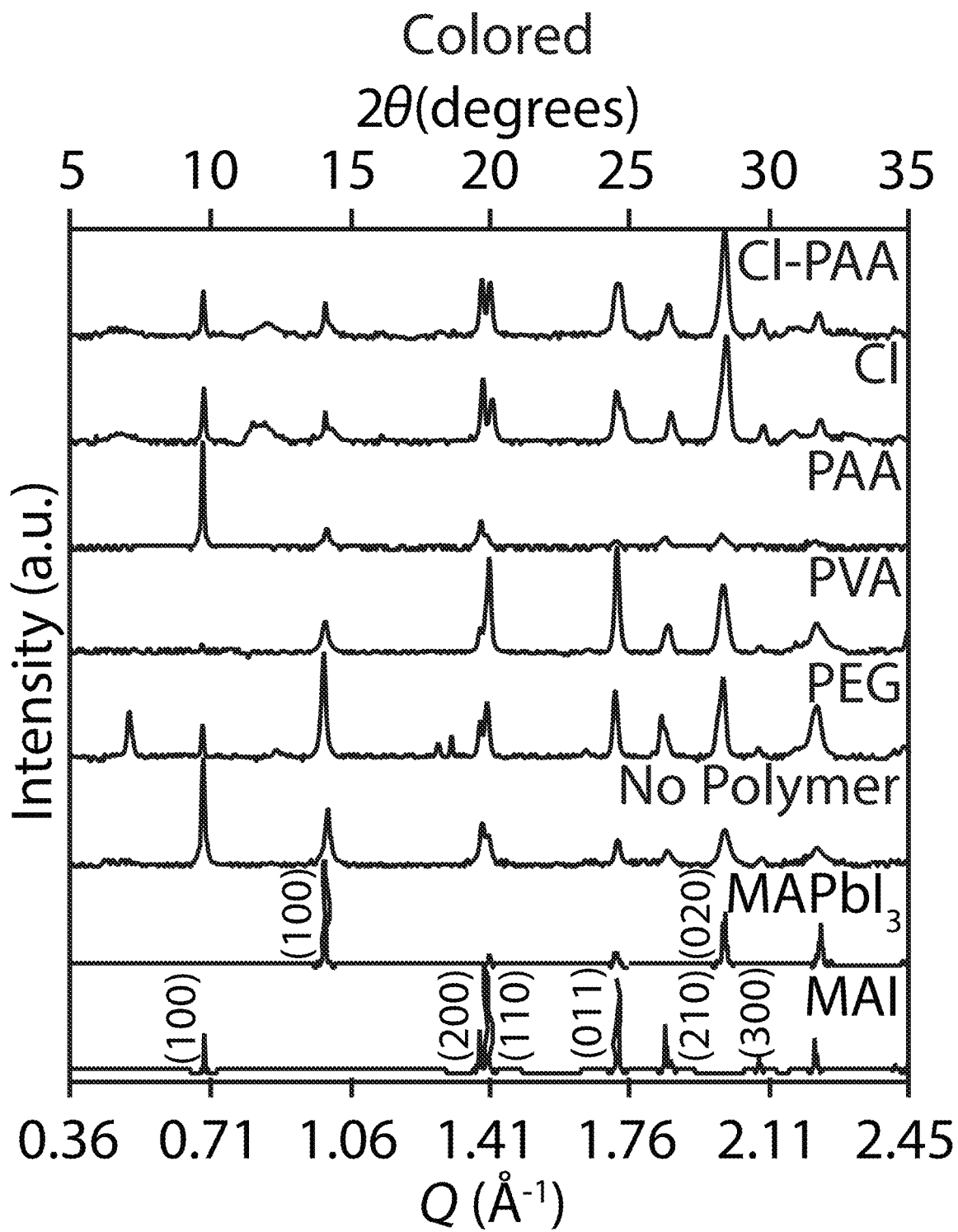
Figure 4E:
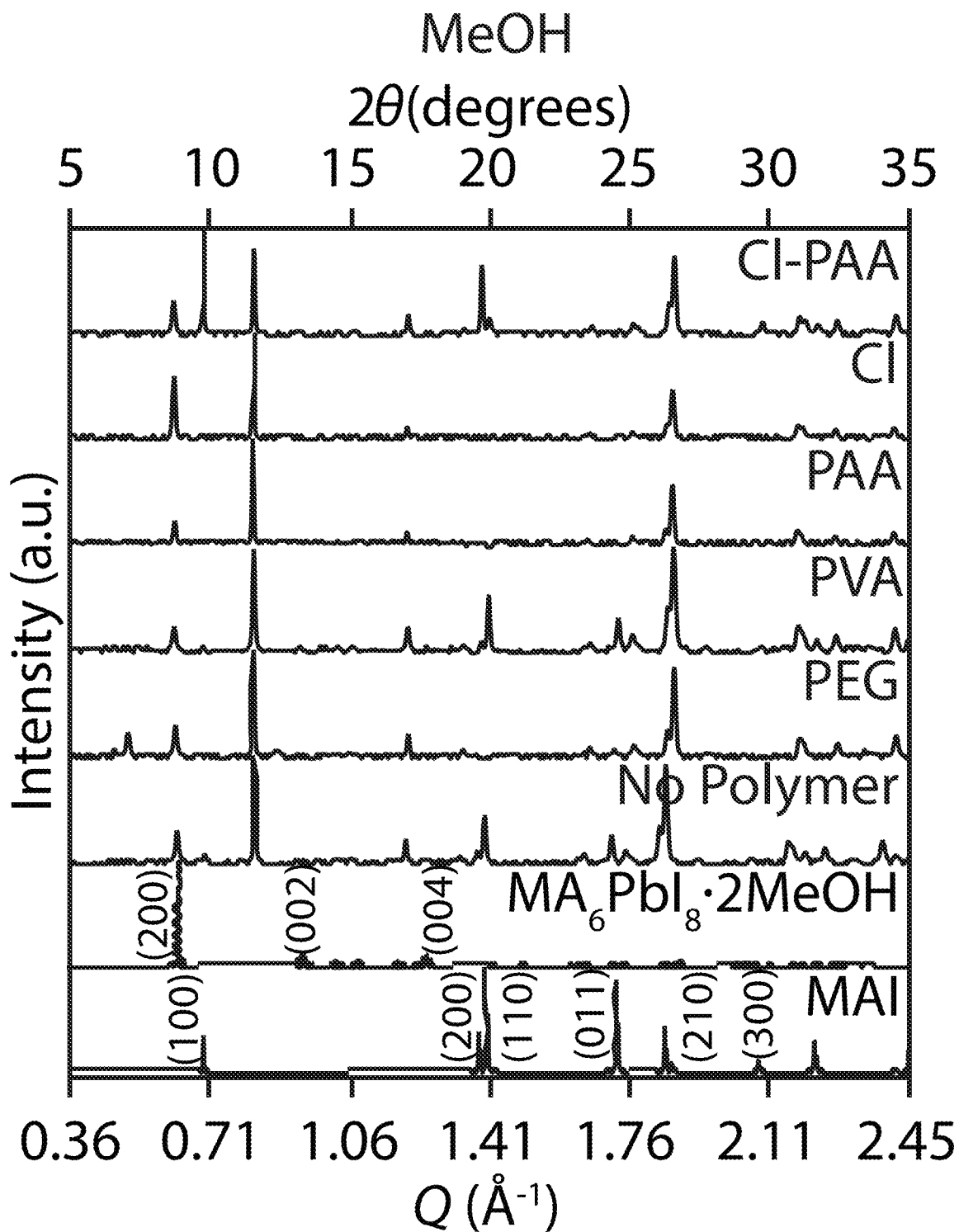

The crystal structure of the bleached (i.e., transparent) and colored (i.e., opaque) state of the composite films were unaffected by the inclusion of excess salt (e.g., MAI with our without MACl) or the polymer (see FIGS. 4C-E). The initial films in the opaque state exhibited a brown color, and wide-angle X-ray scattering (WAXS) shows the (100) and (020) Bragg diffraction peaks of tetragonal $MAPbI_3$ and the (100), (200), (110), (011), (210), and (300) Bragg diffraction peaks of crystalline MAI. The calculated Scherrer crystalline domain size suggests that the initial films were composed of 39±7 nm $MAPbI_3$ nanoparticles surrounded by a second phase that included MAI with a domain size of 50±3 nm (see FIG. 4D). Incorporation of polymers into the composite film did not introduce new diffraction peaks, with the exception of additional crystalline peaks in the PEG thermochromic perovskite film at 0.50 Å−1, 1.29 Å$^{-1}$, and 1.32 Å$^{-1}$. The relative intensity ratios of the MAI peaks changed when polymers were introduced, which may be attributed to the incorporation of polymer into the MAI-containing second phase that disrupts the crystal packing of the MAI molecules along different planes. In addition, no new peaks arose due to incorporation of excess salt (the extra peak at 0.83 Å$^{-1}$ is due to residual hydrated phases) because MACl is known to evaporate from $MAPbI_3$ films during annealing to leave a small amount of chloride in the film. PAA decreased the relative intensity of the MAI when excess MACl salt was incorporated into the composite film (with a perovskite first phase and a second phase include excess salt and polymer), which is consistent with PAA incorporation into the second phase. Note that $MAPbI_3$ is describe below in detail as the perovskite used in the composite perovskite-containing compositions, other perovskite formulations are expected to perform similarly. Example of alternative perovskite compositions that may be used in some embodiment of the present disclosure include $MA_{(1-x-y)}FA_xCs_yPbX_3$, where both x and y are independently between zero and one, inclusively, and where X may be any combination of one or more halides (e.g., bromide, chloride, and/or iodide).

WAXS shows Bragg diffraction peaks consistent with composite perovskite films without polymer in the opaque state and upon conversion to the transparent state with $H_2O$ or MeOH as switching molecules, which indicates each thermochromic mechanism is the same (see FIGS. 4C-E). Exposure to $H_2O$ or MeOH vapor induced the disappearance of $MAPbI_3$ and MAI Bragg diffraction peaks with the emergence of (011) and (101) peaks characteristic of $MA_4PbI_6 \cdot 2H_2O$ (see FIG. 4D), the (200), (002), and (004) peaks characteristic of $MA_6PbI_8 \cdot 2MeOH$ (see FIG. 4E), and additional peaks at 0.82 Å$^{-1}$, 1.21 Å$^{-1}$, 1.34 Å$^{-1}$, 1.65 Å$^{-1}$, and 1.78 Å$^{-1}$ that are associated with methanolation (see FIG. 4E, gray vertical columns). Bragg diffraction peaks characteristic of hydration and methanolation disappeared when the composite thermochromic perovskite film was heated above $T_C$ (see FIG. 4D).

Figure 5A:
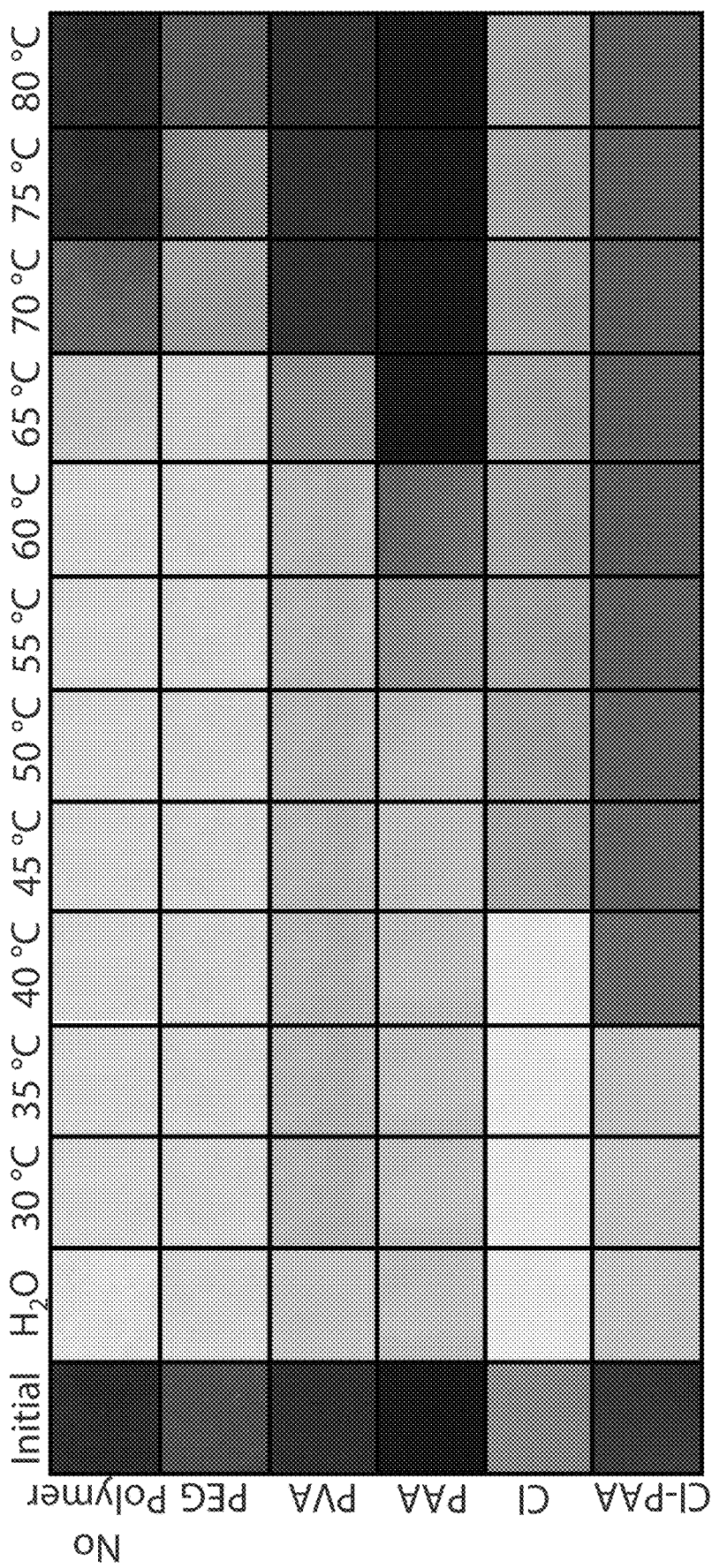
FIG. 5A illustrates representative photographs showing the color changes of composite perovskite films incorporating polymers and/or doped with excess MACl salt upon exposure to $H_2O$ by heating up 70° C. in 5° C. increments to identify the film's $T_C$, according to some embodiments of the present disclosure.
Figure 5B:
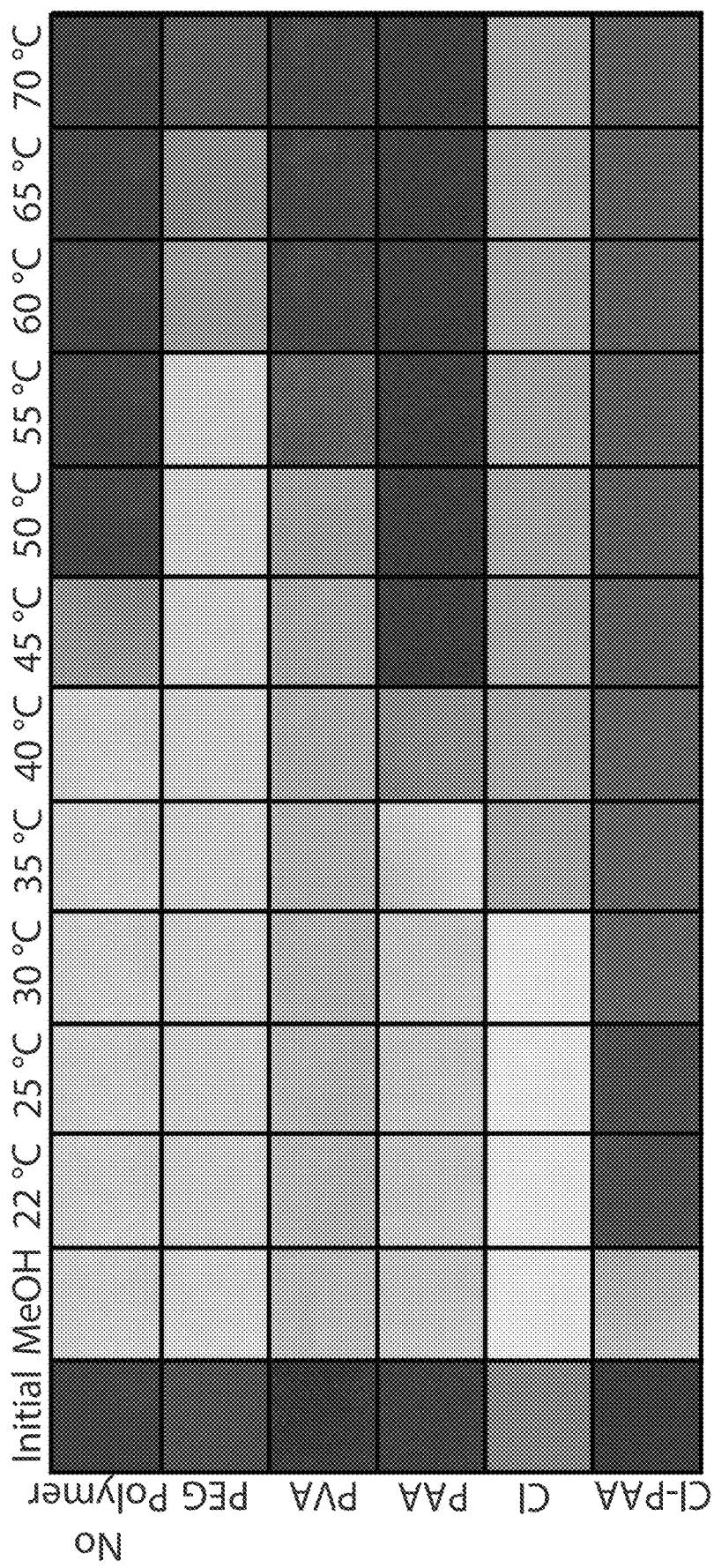
FIG. 5B illustrates representative photographs showing the color changes of composite perovskite films incorporating polymers and/or doped with excess MACl salt upon exposure to MeOH followed by heating up 70° C. in 5° C. increments to identify the film's $T_C$, according to some embodiments of the present disclosure.
Figure 5C:
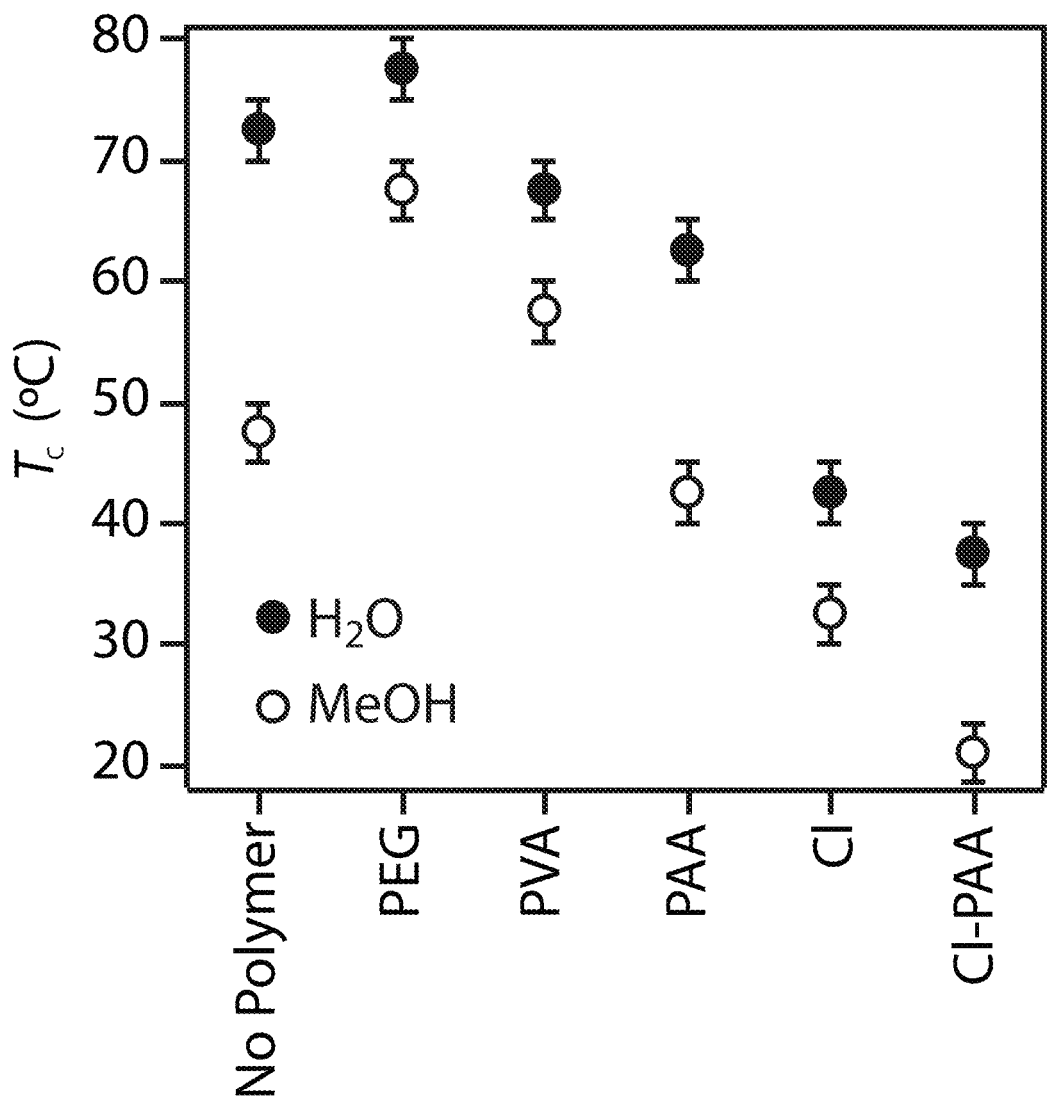
FIG. 5C illustrates the thermochromic transition temperature ($T_C$) for each composite perovskite film extracted from FIGS. 5A and 5B, according to some embodiments of the present disclosure.
Figure 5D:
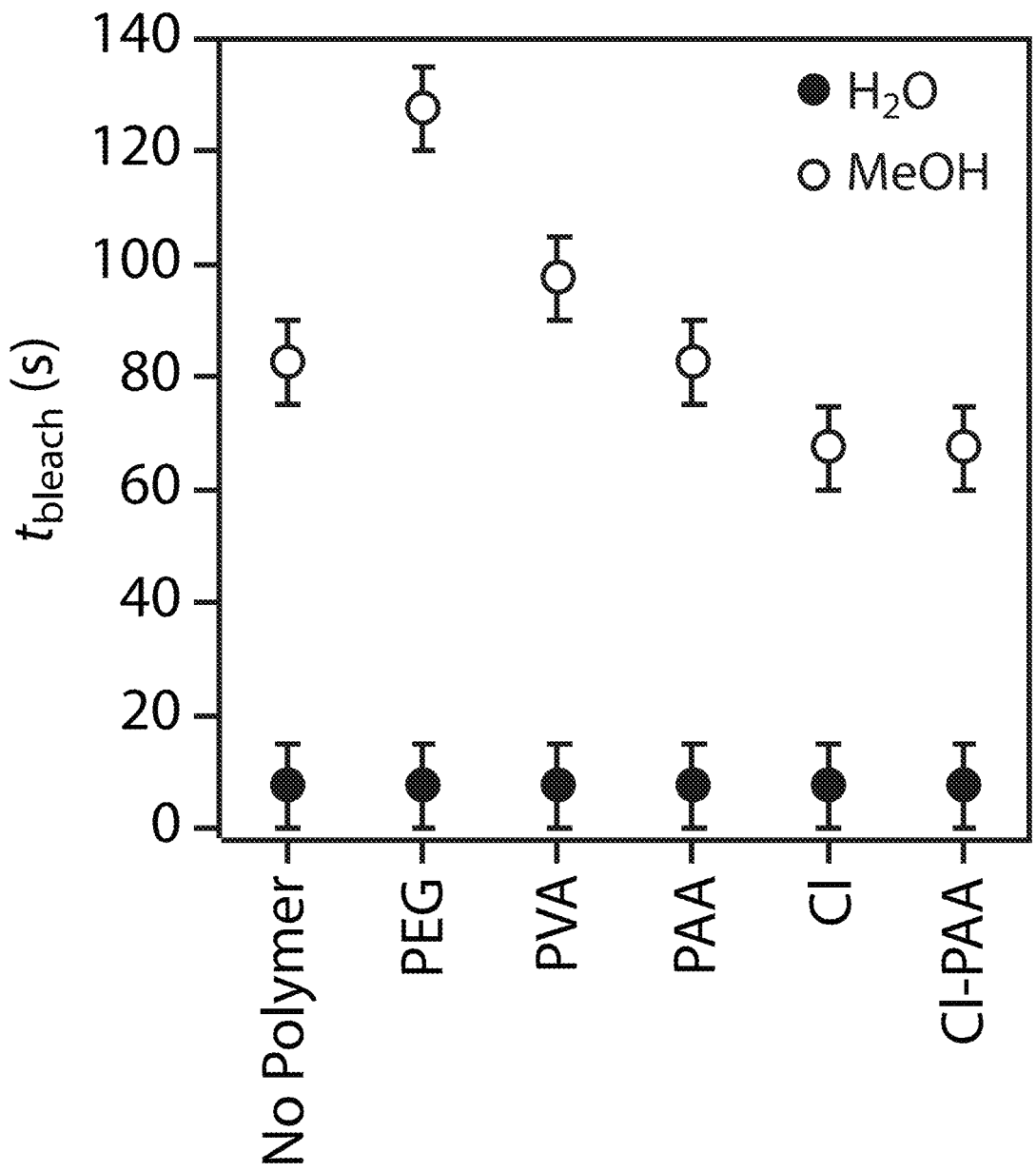
FIG. 5D illustrates the time for bleaching to occur ($t_{bleach}$) defined as the time for the $MAPbI_3$ (100) peak to disappear as determined from in-situ WAXS data with a resolution of 15 seconds as shown in FIGS. 13A-F, according to some embodiments of the present disclosure.

$T_C$ values were determined by heating transparent composite perovskite films until a color change was observed (i.e., until the composite perovskite-containing composition changed to a substantially opaque state), which corresponds to the switching molecule no longer disrupting the perovskite's $ABX_3$ crystal structure. There are clear trends that relate to the polymer and/or excess salt incorporation with the switching molecules, $H_2O$ (see FIG. 5A) or MeOH (see FIG. 5B). Exposure of thermochromic composite perovskite-containing films to $H_2O$ vapor at a concentration of greater than about 35% relative humidity (RH) bleached the composite compositions due to the structural transformation of 3D $MAPbI_3$ to 0D $MA_4PbI_6 \cdot 2H_2O$ upon intercalation of the $H_2O$ switching molecule. Heating the perovskite-containing composite compositions to above the $T_C$ of the hydrated forms of the composite compositions (between about 70° C. and about 75° C., see FIG. 5C) reproduced the original brown color (see FIG. 5A) by dehydrating the composite composition, resulting in the conversion of 0D $MA_4PbI_6 \cdot 2H_2O$ back into 3D $MAPbI_3$ (see FIG. 4B). Similarly, composite perovskite-containing films incorporating polymer bleached upon exposure to greater than about 35% RH and then darkened upon heating above $T_C$ (see FIG. 5A). It was found that the $T_C$ of hydrated perovskite-containing compositions followed the trend: PEG (75-80° C.)>No Polymer (70-75° C.)>PVA (65-70° C.)>PAA (60-65° C.). Interestingly, even though incorporation of polymers affected $T_C$, they did not affect the time for bleaching to occur ($t_{bleach}$) upon hydration, with all of the composite perovskite-containing films tested exhibiting $t_{bleach}$ in less than 15 seconds (see FIG. 5D).

Exposing the same composite perovskite-containing films to MeOH vapor also bleached the composite films (see FIG. 5B) due to the structural transformation of 3D $MAPbI_3$ into 0D $MA_6PbI_8 \cdot 2MeOH$ (see FIG. 4E) upon intercalation of the MeOH switching molecule into the perovskite phase. Heating above the $T_C$ of the methanolated composite perovskite-containing films (45-50° C., see FIG. 5C) reproduced the original brown color (see FIG. 5A) by demethanolating the composite film, resulting in conversion of 0D $MA_6PbI_8 \cdot 2MeOH$ back into the 3D $MAPbI_3$ perovskite (see FIG. 4E). It was determined that the $T_C$ of the composite perovskite-containing films was reduced when MeOH was used as the switching molecule, versus water, possibly because MeOH exhibits weaker H-bonding compared to $H_2O$. Specifically, the $T_C$ of methanolated composite perovskite-containing films followed the trend: PEG (65-70° C.)>PVA (55-60° C.)>No Polymer (45-50° C.)>PAA (40-45° C.). In contrast to when water was used as the switching molecule, $t_{bleach}$ varies significantly upon methanolation following the trend PEG (120-130 seconds)>PVA (90-105 seconds)>no polymer (75-90 s)≅PAA (75-90 seconds) (see FIG. 5D). The higher $t_{bleach}$ times of methanolation compared to hydration suggests the driving force for methanolation is weaker than hydration.

Figure 6A:
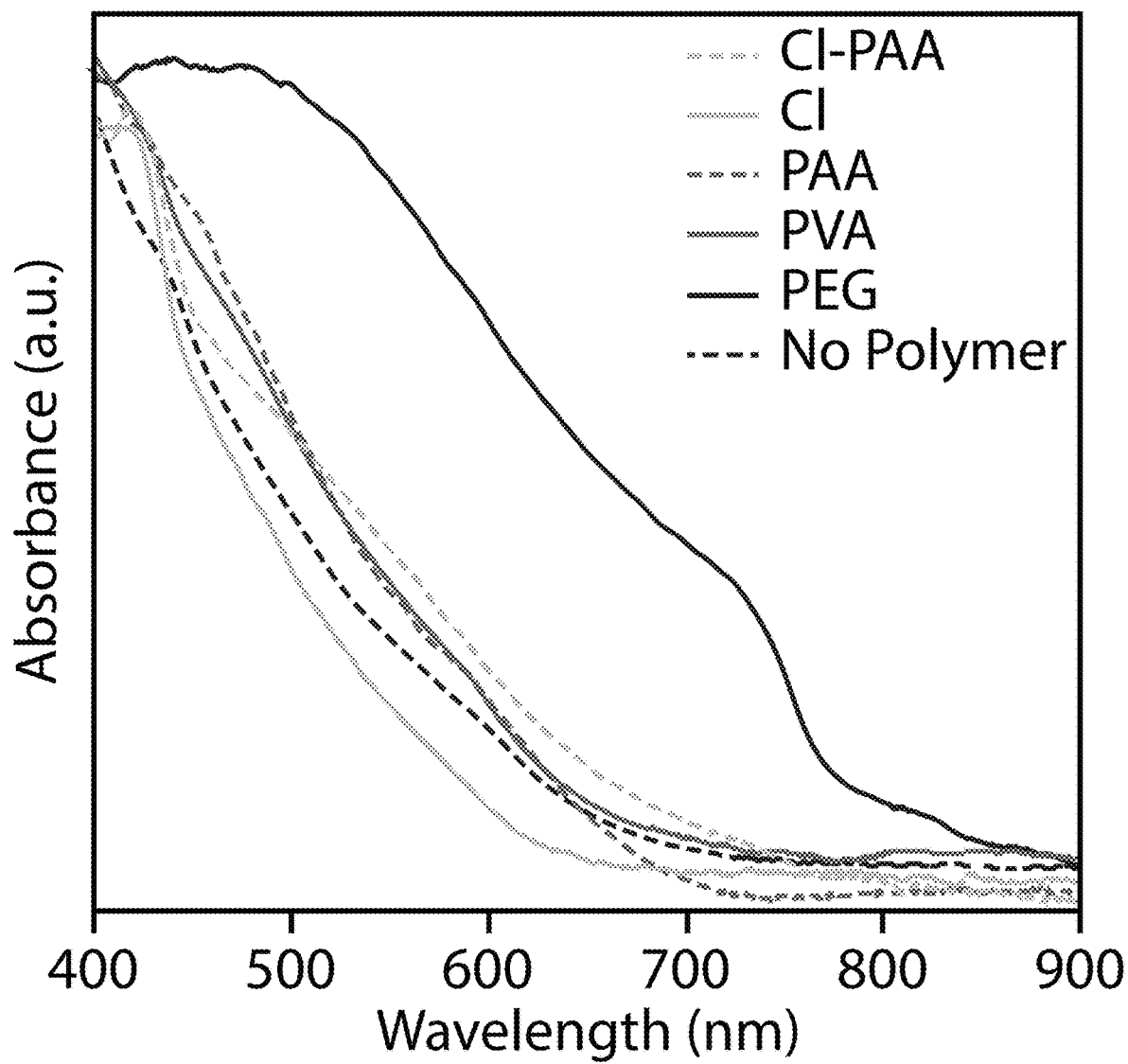
FIG. 6A illustrates absorbance measurements collected on composite perovskite-containing films heated above $T_C$, according to some embodiments of the present disclosure.
Figure 6B:
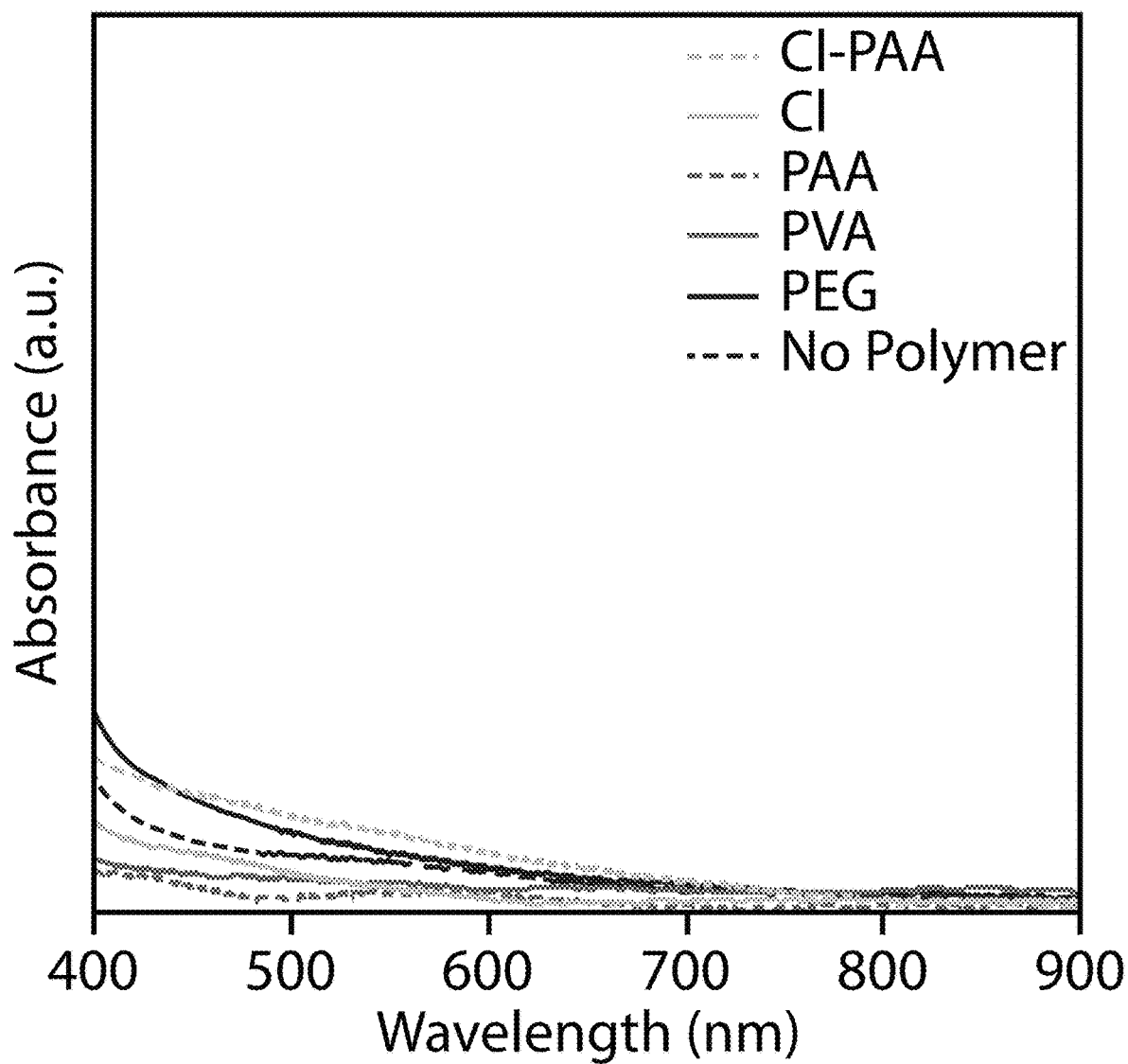
FIG. 6B illustrates absorbance measurements collected on composite perovskite-containing films bleached with $H_2O$, according to some embodiments of the present disclosure.
Figure 6C:
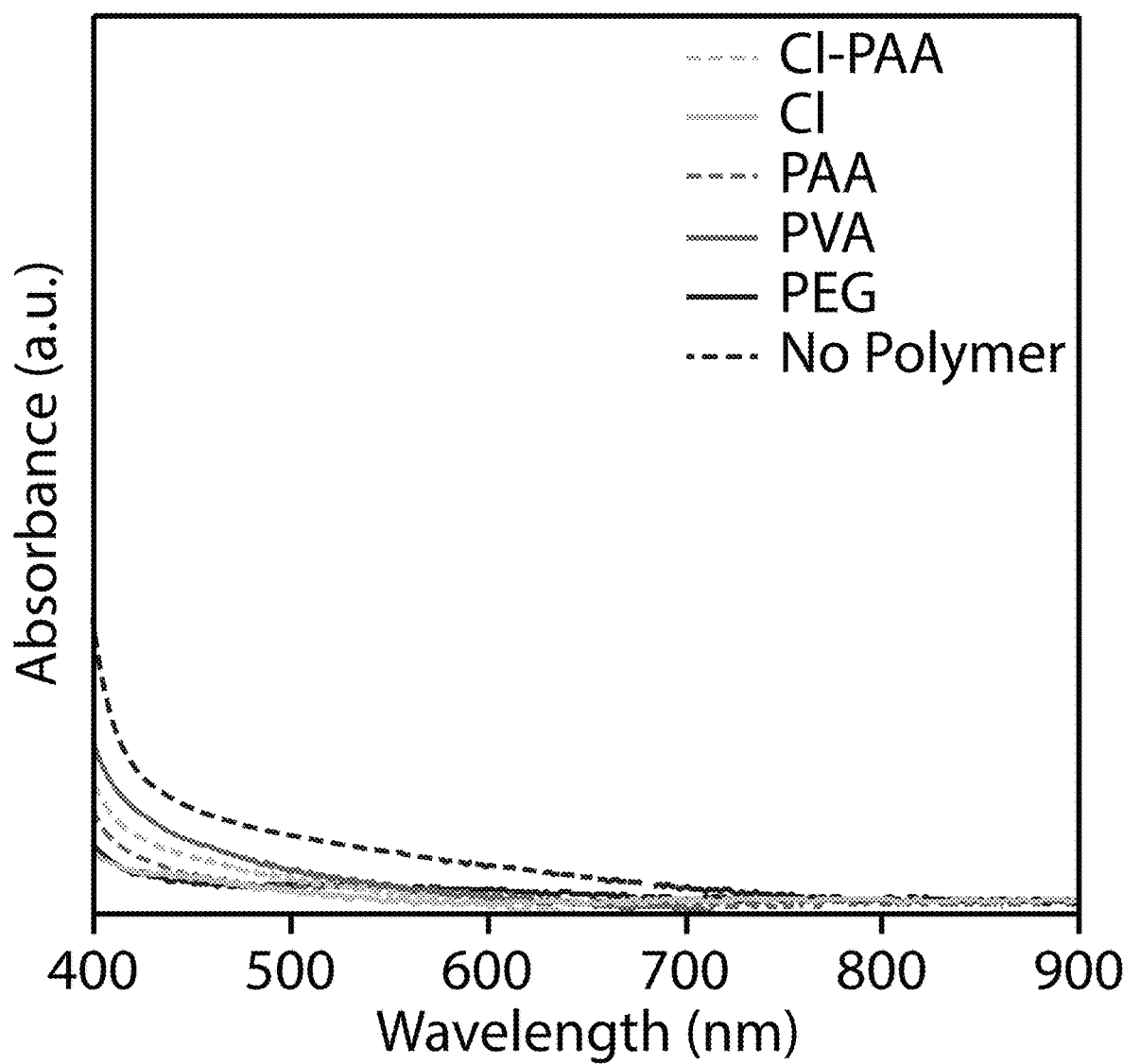
FIG. 6C illustrates absorbance measurements collected on composite perovskite-containing films bleached with MeOH, according to some embodiments of the present disclosure.

As shown herein, incorporation of a small amount of AX salt can reduce $T_C$. For example, incorporation of excess MACl produced reddish films (see FIGS. 5A and 5B) with a significantly blue-shifted absorbance (see FIGS. 6A-6C), where "excess" refers to any MAI and MACl used beyond the stoichiometric amount of AX salt needed to form the $ABX_3$ perovskite, in this example $MAPbI_3$. The composite films were bleached (i.e., became transparent) upon exposure to both $H_2O$ and MeOH switching molecules in the vapor phase, with lower $T_C$ values between about 40° C. and about 45° C. for hydrated films and between about 30° C. and about 35° C. for methanolated films (see FIG. 5C). Without wishing to be bound by theory, the gradual loss of MACl during film formation suggests that Cl may influence the composite perovskite-containing film formation while a small amount of excess MACl in the composite film after annealing suggests that the MACl may facilitate the transformation by producing a hydrophilic interface between the $MAPbI_3$ perovskite phase (i.e., first phase) and a MAI matrix (i.e., second phase). Combining MACl-doping with the polymer in the second phase exhibited the lowest $T_C$, where the combination of PAA with excess MACl induced an even further drop in $T_C$ to a range between about 30° C. and about 35° C. for hydrated films (using water as the switching molecule) and to a range between about 20° C. and about 25° C. for methanolated films (using methanol as the switching molecule) (see FIG. 5C). MACl alone in the second phase and the combination of excess MACl and PAA also further reduced $t_{bleach}$ time when using methanol to a range between about 60 seconds and about 75 seconds for both thermochromic perovskite films.

As shown herein, incorporation of polymers and excess MACl salt into the second phase of the composite perovskite-containing composition allowed control of the $T_C$ over a 45° C. or 50° C. range when $H_2O$ or MeOH, respectively, was used as the switching molecule. In addition, MeOH as the switching molecule allowed control over the $t_{bleach}$ time in a 60 second window. These results demonstrate the successful fabrication of a composite perovskite-containing composition (e.g., film) exhibiting a $T_C$ within a desirable range between about 20° C. and about 27.5° C. through the co-incorporation of an excess salt (e.g., MACl) with a polymer (e.g., PAA) in a second phase (with the perovskite being the first phase) and by using MeOH as a switching molecule for inducing the reversible switching between a substantially opaque perovskite phase and a substantially transparent perovskite phase. The MACl-PAA-containing perovskite films with MeOH as the switching molecule exhibited the lowest $T_C$ between about 20° C. and about 25° C. (see FIG. 5C) and the fastest $t_{bleach}$ time upon methanolation between about 60 seconds and about 75 seconds (see FIG. 5D).

Figure 7A:
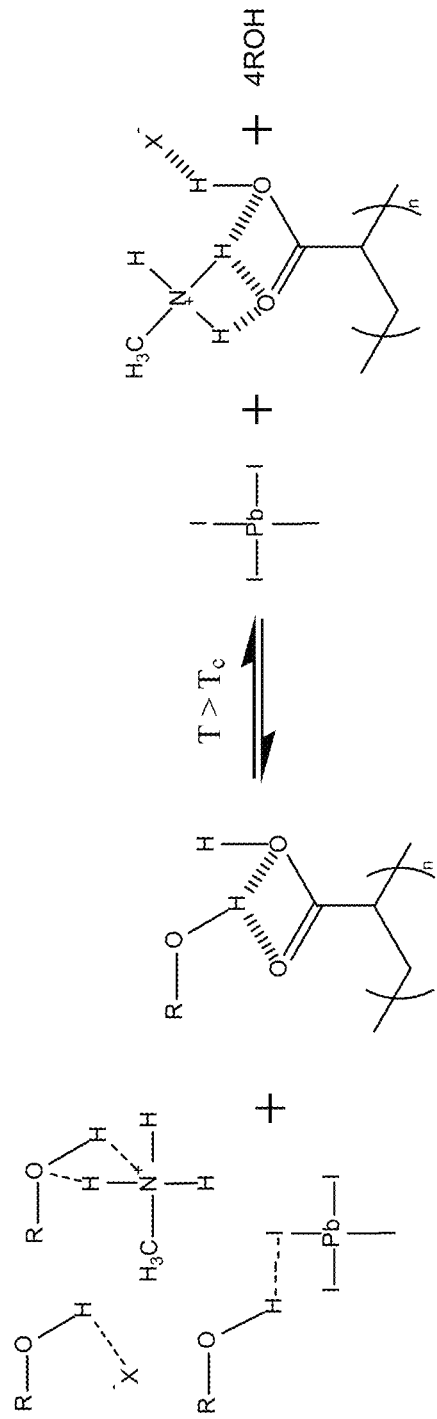
FIG. 7A illustrates a schematic of representative H-bond interactions in the bleached and color states of the composite thermochromic perovskite film, according to some embodiments of the present disclosure.

The colored-to-bleached transition occurs due to methylammonium halide (MAX, where $X=I^-$ or $Cl^-$ molecules diffusing from the second phase of excess salt (e.g., MAX) and polymers into the perovskite phase stabilized by the intercalation of $H_2O$ or MeOH switching molecules. $T_C$ can be thought of as the energy required for the mass transfer of the excess salt to occur and is dictated by, among other things, the hydrogen bonds (H-bonds) in the composite composition. The H-bonds in the system are chemically diverse (see FIG. 7A), but the trends observed in $T_C$ are easily rationalized by considering the number and strength of the different bonds. H-bonds are the thermodynamic driving force for chromism in the composite perovskite-containing films, and the chromic state is controlled by varying both the strength and number of H-bonds in the system Both $H_2O$ or MeOH switching molecules may hydrogen-bond with lead iodide in the perovskite first phase, as well as salt molecules (e.g., MAX) and polymers present in the second phase, thereby stabilizing the bleached state of the composite perovskite-containing composition. In the simplest system, where no polymer or excess salt is included, H-bond interactions between the switching molecules and the perovskite phase and the second phase made only of MAX dominate. The Gibbs free energy of H-bonding between MeOH as the switching molecule and other system components is less than that of $H_2O$ resulting in a lower activation barrier. The fewer and weaker H-bonds of MeOH compared to $H_2O$ in the perovskite phase results in a 25° C. decrease in $T_C$; less energy is needed to de-intercalate MeOH than $H_2O$. It was also determined that the weaker H bonding for MeOH results in increased $t_{bleach}$ time for methanolation (between about 70 seconds and about 90 seconds) compared to hydration (<15 seconds) (see FIG. 5D).

Figure 8A:
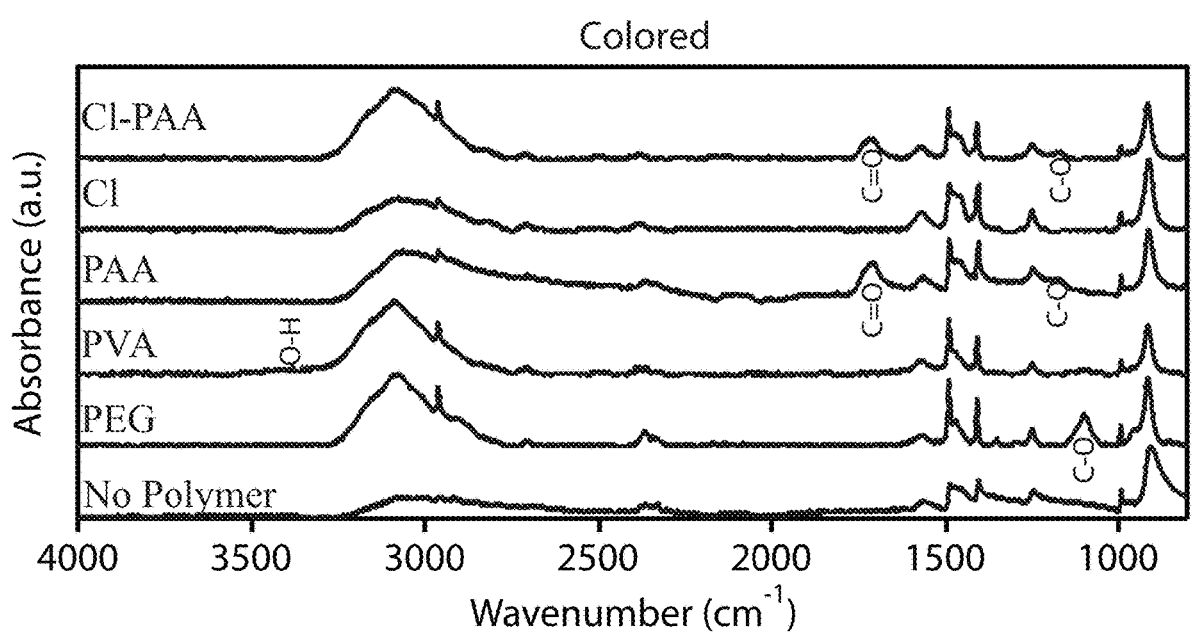
FIG. 8A illustrates attenuated total reflectance Fourier transform infrared (ATR-FTIR) spectroscopy data of a composite perovskite-containing film in the colored state, according to some embodiments of the present disclosure.
Figure 8B:
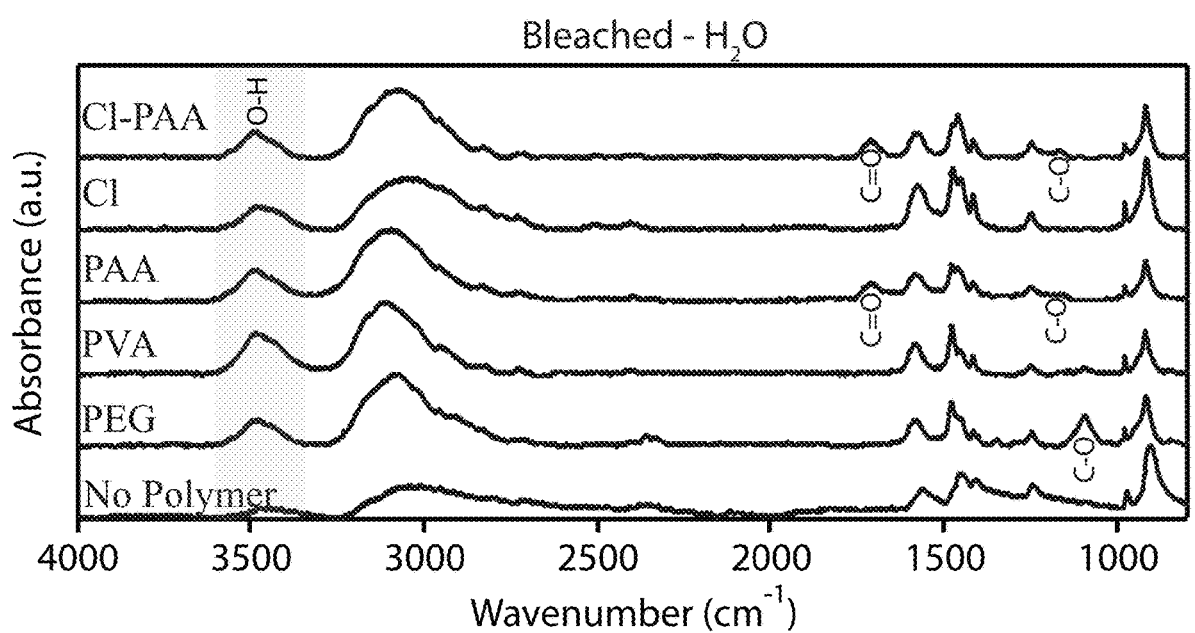
FIG. 8B illustrates attenuated total reflectance Fourier transform infrared (ATR-FTIR) spectroscopy data of a composite perovskite-containing film after exposure to H$_2$O, according to some embodiments of the present disclosure.
Figure 8C:
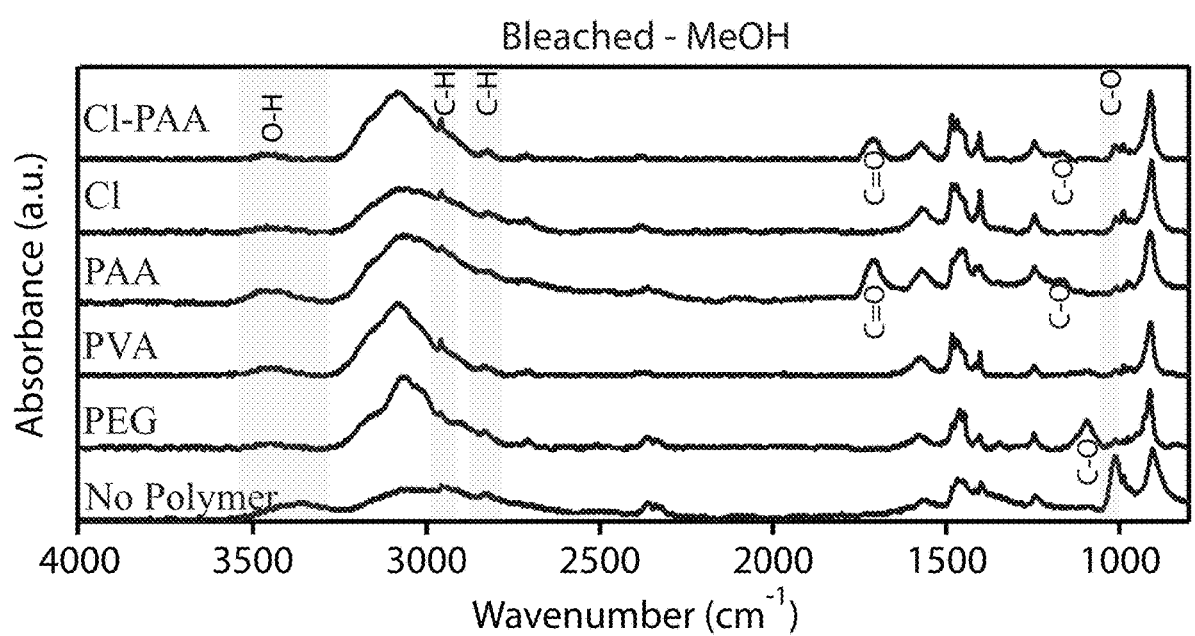
FIG. 8C illustrates attenuated total reflectance Fourier transform infrared (ATR-FTIR) spectroscopy data of a composite perovskite-containing film after exposure to MeOH vapor, according to some embodiments of the present disclosure.

Attenuated total reflectance Fourier transform infrared spectroscopy (ATR-FTIR) was used to probe the H-bonding present in the composite compositions at the molecular level. ATR-FTIR spectra of composite films in the colored phase contain vibrational modes corresponding to MA in MAI and $MAPbI_3$, characterized by vibrational modes of the methylammonium molecules (N—H stretching between 2900-3250 cm-1, N—H bending centered at 1557 $cm^{-1}$, N—H rocking centered at 1243 $cm^{-1}$, and C—N stretching centered at 970 $cm^{-1}$) (see FIG. 8A). Introduction of an intercalating switching molecule produced characteristic O—H stretching from $H_2O$ or MeOH along with C—H asymmetric stretching, C—H symmetric stretching, and C—O stretching vibrational modes at 3440 $cm^{-1}$, 2970 $cm^{-1}$, 2830 $cm^{-1}$, and 1013 $cm^{-1}$, respectively, for MeOH (see FIGS. 8A-8C). As expected, heating the film above $T_C$ caused vibrational modes corresponding to $H_2O$ and MeOH to disappear. The characteristic opaque phase ($MAPbI_3$) peak is centered at 3000 $cm^{-1}$. That peak is also there for the transparent phase, but there is an added peak at 3400 cm−1 for the methanolated phase and 3500 $cm^{-1}$ for the hydrated phase. For the polymers, the characteristic peaks are: 1700 $cm^{-1}$ for poly acrylic acid (PAA) and 1100 $cm^{-1}$ for polyethylene glycol (PEG).

Figure 7B:
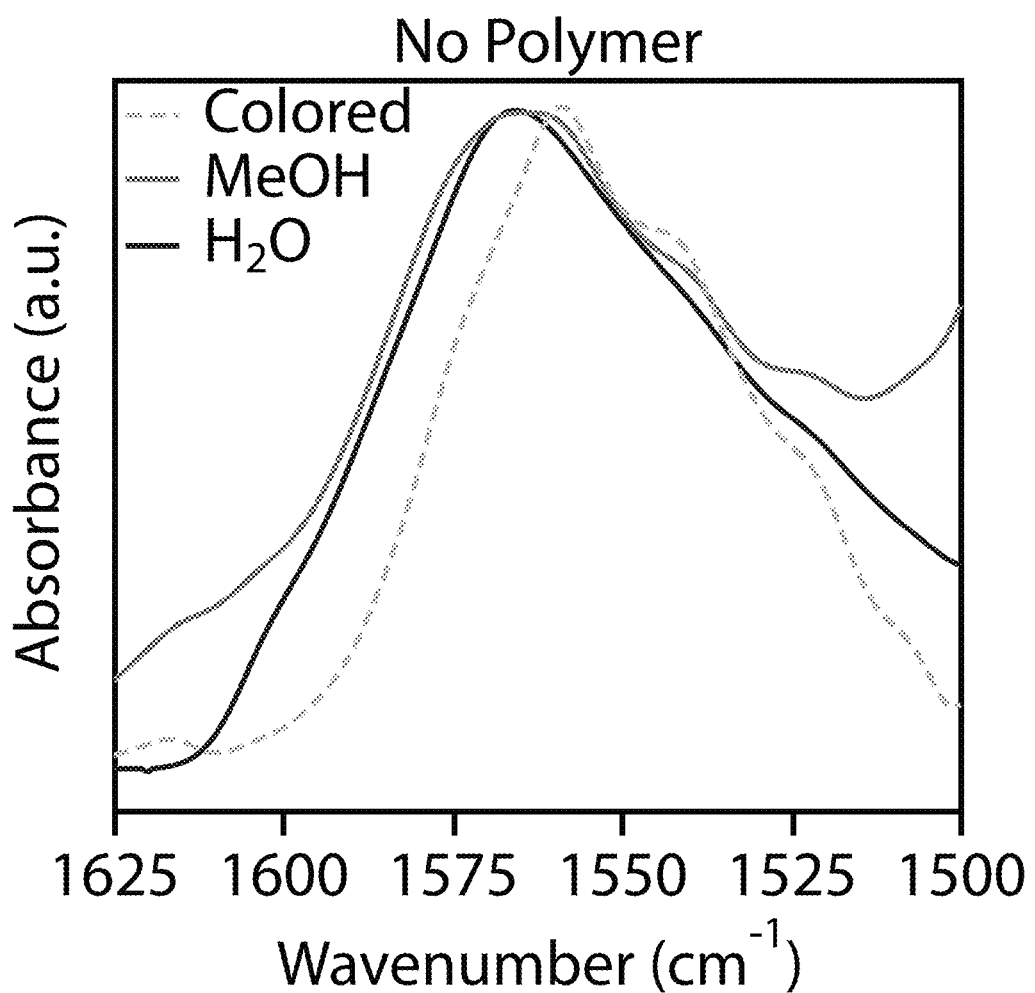
FIG. 7B illustrates attenuated total reflectance Fourier transform infrared (ATR-FTIR) spectra of the N—H bending mode of thermochromic perovskite films without a polymer, according to some embodiments of the present disclosure.

The N—H bond of methylammonium halide salt molecules is a unique indicator of the H-bonding environment in both colored and bleached states. The N—H bending mode due to its spectral isolation compared to other MA bonds was studied (see FIG. 7B). When no polymer was incorporated into the composite perovskite-containing films, the vibrational mode was centered at 1557 $cm^{-1}$. Upon exposure to $H_2O$ or MeOH, the N—H mode shifted to higher energy, indicating a donation of electron density from the intercalated switching molecule to methylammonium, which is consistent with the bonding behavior between amines and hydroxyl groups. The N—H bending peak also broadened, which indicates a more chemically diverse bonding environment due to the presence of the intercalating switching molecule.

Figure 7C:
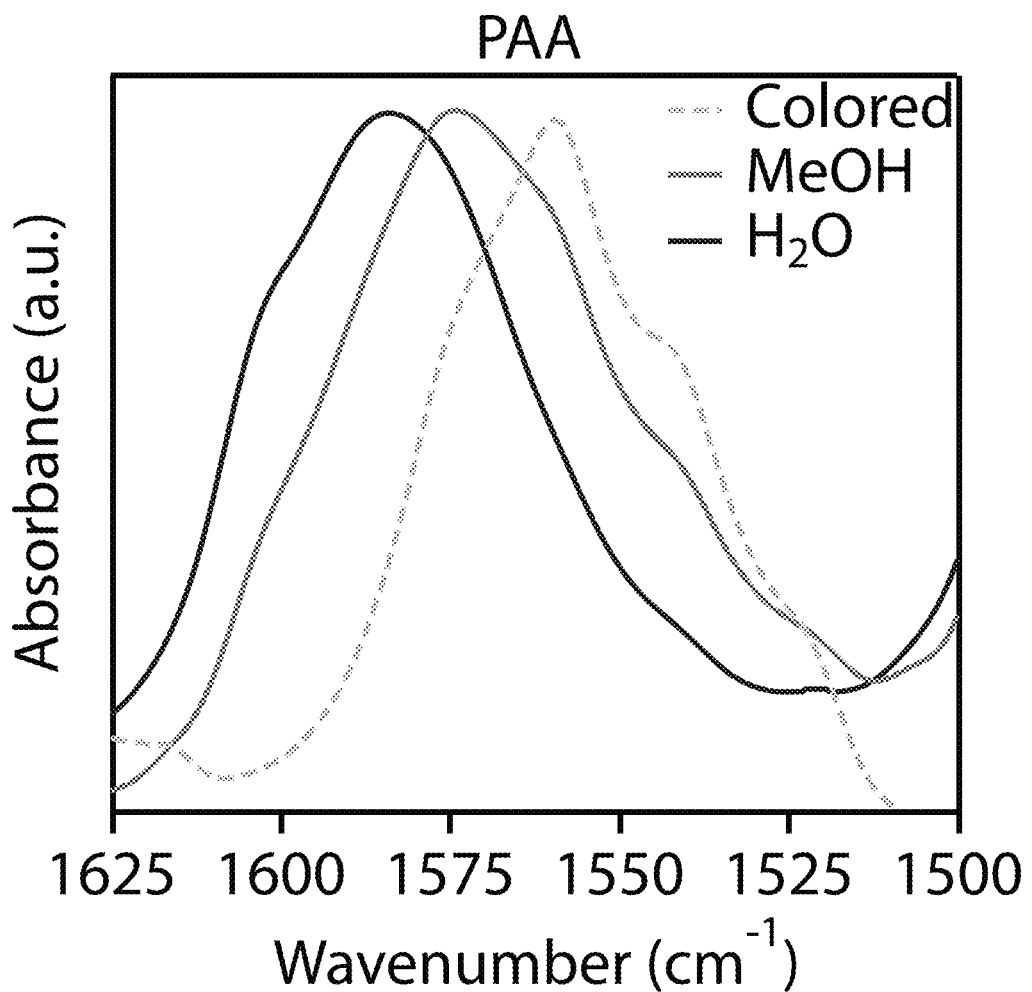
FIG. 7C illustrates attenuated total reflectance Fourier transform infrared (ATR-FTIR) spectra of the N—H bending mode of thermochromic perovskite films with PAA, according to some embodiments of the present disclosure.

The addition of polymers to the composite perovskite-containing films was confirmed by ATR-FTIR from the presence of vibrational modes characteristic of the functional groups of the polymers: C—O stretching of PEG at 1098 $cm^{-1}$, O—H stretching of PVA between 3550 $cm^{-1}$ and 3300 $cm^{-1}$, C=O and C—O stretching of PAA at 1710 $cm^{-1}$ and 1170 $cm^{-1}$, respectively. Exposure of the perovskite-containing film to $H_2O$ switching molecule vapor caused characteristic O—H stretching vibrational modes to appear centered at 3490 $cm^{-1}$ (see FIGS. 8A-8C). The N—H bending mode signal is a convolution of MA molecules that are in the perovskite phase and those that are in the second phase. The N—H bending mode is thus a measure of the influence of the polymers incorporated into the second phase (see FIG. 7C). For PAA, the N—H bending mode in the colored state blue shifted slightly to 1560 cm$^{-1}$ due to interactions with the carboxylic acid groups of the PAA. MeOH intercalation broadened and blue-shifted the peak by donating and accepting H-bonds with the carboxylic acid groups and the MeOH. H$_2$O further blue-shifted the N—H bending peak due to more and stronger H-bonds formed. A blueshift of between 5 and 20 cm$^{-1}$ to higher energies (wavenumber) indicates the formation of a hydrogen bond in the composite.

Figure 7D:
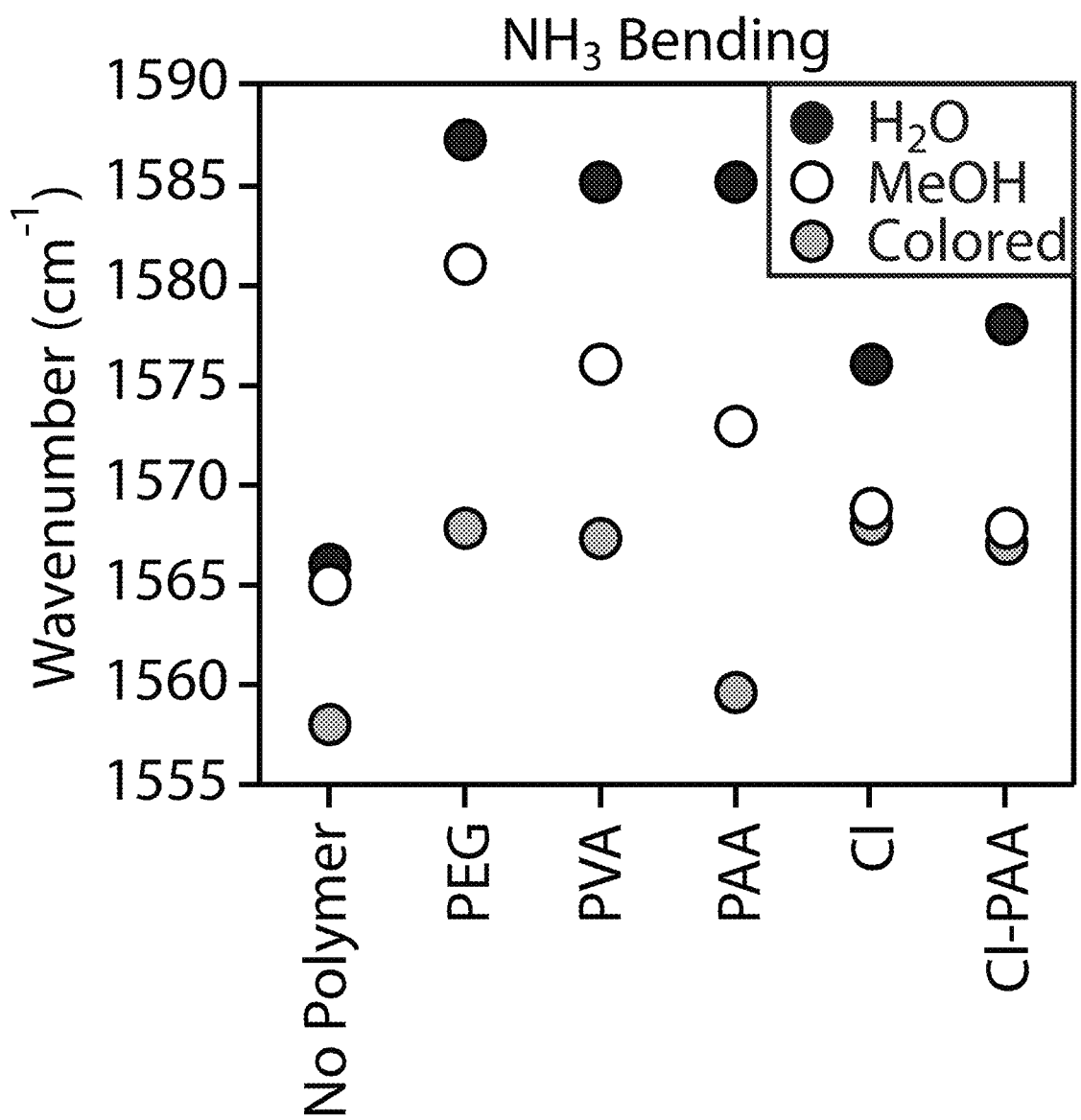
FIG. 7D illustrates attenuated total reflectance Fourier transform infrared (ATR-FTIR) spectra of the N—H bending mode of various films in the colored state and after exposure to $H_2O$ and MeOH vapor, according to some embodiments of the present disclosure. Peak position of the N—H bending vibrational modes for each thermochromic perovskite film in the colored state and after exposure to $H_2O$ and MeOH.

The same general blue-shifting trend was observed for PEG and PVA (see FIG. 7D) but to varying degrees. Blue shifting of N—H vibrational modes was comparable between polymers with H$_2$O as the switching molecule, whereas blue shifting was increased according to PEG<PVA<PAA with MeOH as the intercalating switching molecule. The trend is consistent with the types of H-bonds provided by each polymer. The ether group of PEG will only donate electron density (accept H-bonds), which results in blue-shifting of the N—H bond. In contrast, the acidic protons of in the hydroxyl and carboxylic acid groups of PVA and PAA, respectively, will accept and donate H-bonds. The ATR-FTIR signal of the N—H is a convolution of all H-bonds formed within the system, which results in a smaller overall shift due to also donating H-bonds to the polymer.

The trend in $T_C$ between polymers is consistent with the polymer's ability to form H-bonds. PEG consistently increased $T_C$ relative to the composite perovskite-containing compositions without polymers, and PEG was the weakest H-bonding polymer. PAA, on the other hand, consistently decreased $T_C$ relative to other composite compositions. The carboxylic acid groups of PAA form the strongest and highest number of bonds compared to the others, which resulted in the lowest $T_C$. PVA is in between PEG and PAA by decreasing $T_C$ with H$_2$O and increasing $T_C$ with MeOH relative to the composite perovskite-containing films without polymer. PVA's hydroxyl group is also capable of accepting and donated H-bonds, though the bonds are weaker than those formed with carbonyl groups of carboxylic acid. It may be concluded that a larger Gibbs free energy of H-bonding between the polymer and other composite composition's constituents (MAX and intercalating molecule) competes with the bonds formed in the Pb—I sublattice of the perovskite phase leading to a decrease in $T_C$.

The influence of excess MACl salt is not obvious from the N—H bond signal in ATR-FTIR. The N—H bending mode blue-shifted in the presence of Cl$^-$ to a smaller degree than other samples. However, MACl is highly hygroscopic, whereas MAI is not. Cl$^-$ is a hard Lewis base that will more readily accept H-bonds than I$^-$. Cl$^-$ will provide stronger H-bond interactions within the reservoir and may intercalate into the perovskite phase when bleaching. Stronger bonds to the halide anion led to a decrease in $T_C$.

Taken together, the trend in $T_C$ as a function of the perovskite composites studied herein may be understood in terms of a decrease in the activation energy between the bleached and colored states. Methanol's weaker H-bonds relative to water ($\Delta G^{\ddagger}_{HOH-MAX} > \Delta G^{\ddagger}_{MeOH-MAX}$), the polymer functional groups stronger and more prevalent H-bonds compared to bonding with the Pb—I sublattice of the perovskite phase ($G^{\ddagger}_{poly-MAX} > \Delta G^{\ddagger}_{PbI-MAX}$), and stronger interactions with the halide anion ($\Delta G^{\ddagger}_{ROH-MACl} > \Delta G^{\ddagger}_{ROH-MAI}$) collectively resulted in a $T_C$ within an ideal range for thermochromic windows.

The polymers used in this study contained 11k-130k monomers connected in long chains with functional groups capable of H-bonding with MAX salts contained in the second phase. These long-chain polymers induced the formation of pores throughout the composite perovskite-containing films (see Panel A of FIG. 9A colored) and subsequent exposure of the film to intercalating switching molecules led to a significant decrease in pore density (see Panel A of FIG. 9A bleached). The overall thickness of the film was maintained within statistical error during the transformation (colored 250±20 nm; bleached 240±7 nm), which suggests that the expected volume expansion that should result upon intercalation occurred within the void space of the pores rather than increasing the overall thickness of the film. Heating the film above $T_C$ re-formed the pores while maintaining the film thickness. These observations suggest that the polymers are likely located around the pores in the colored (i.e., opaque) state and at grain boundaries in the bleached (i.e., transparent) state (see FIG. 4A).

Figure 10:
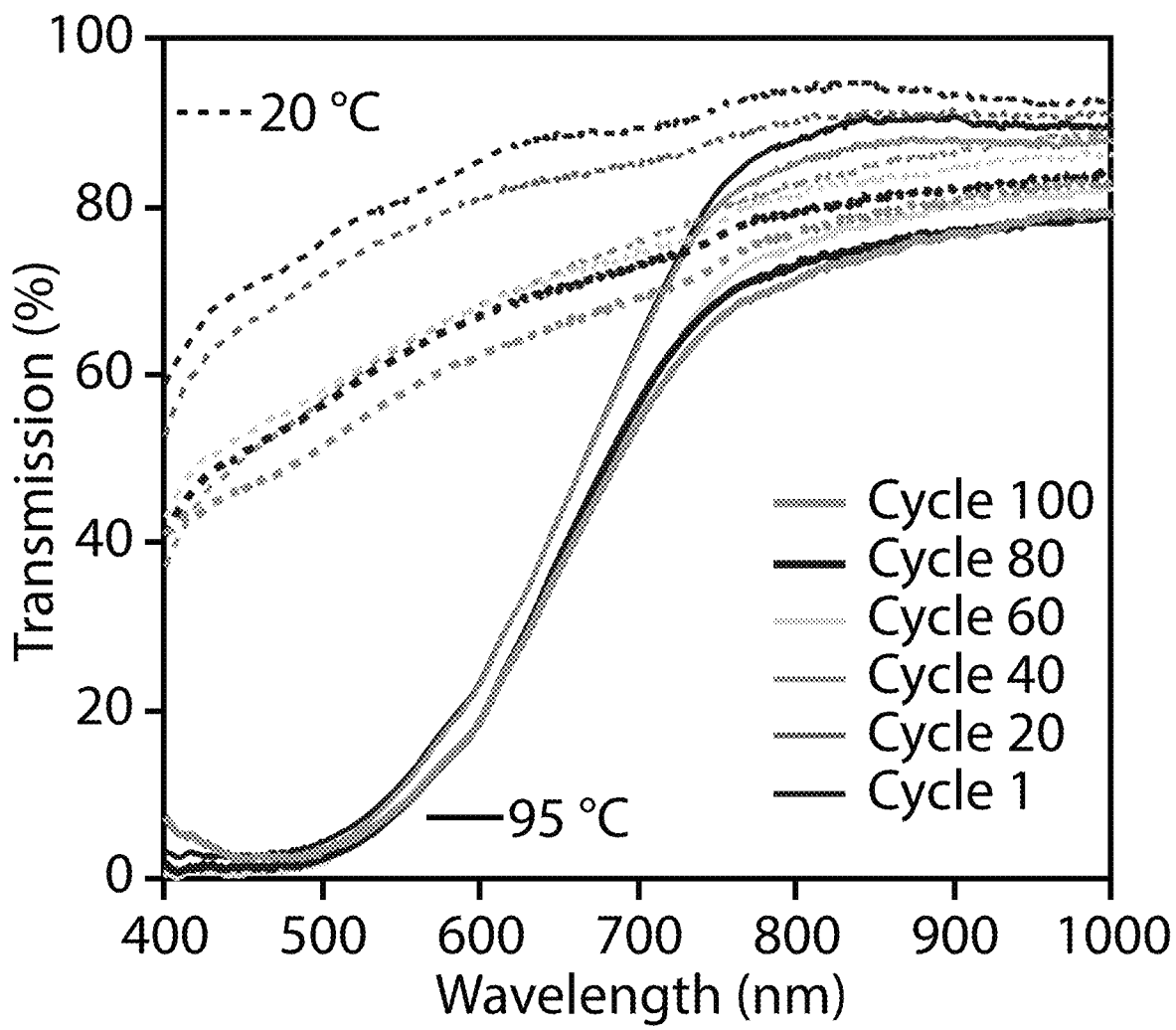
FIG. 10 illustrates transmission data of a smart window using H$_2$O as the intercalation molecule over 100 cycles of alternation exposure to 95° C. (colored state) and 20° C. (bleached state), according to some embodiments of the present disclosure.

In addition to having a low $T_C$ and rapid switching time, smart windows need to be durable. Cyclability of composite perovskite-containing films is currently limited by delamination and composite perovskite-containing film reorganization upon repeated intercalation/de-intercalation as well as deprotonation of MAI upon prolonged exposure to H$_2$O (see FIG. 10). The thermochromic perovskite films described herein, containing polymers, are porous with the polymers located at the thermochromic perovskite/pore interface and that volume expansion occurs inward through the pores rather than outward, which often results in an increase in perovskite film thickness. Thermochromic perovskite films with this morphology should have improved mechanical stability to delamination and cracking. In addition, thermochromic perovskite films that switch with MeOH exhibit a small driving force for MAI deprotonation due to the higher acidity of MeOH vapor compared to H$_2$O. Since the polymers are also contained within the second phase of the composite perovskite-containing compositions, the second phase (including the excess salt) may also be positioned adjacent to pores; i.e., the second phase may share an interface with one or more pores.

Figure 9A:
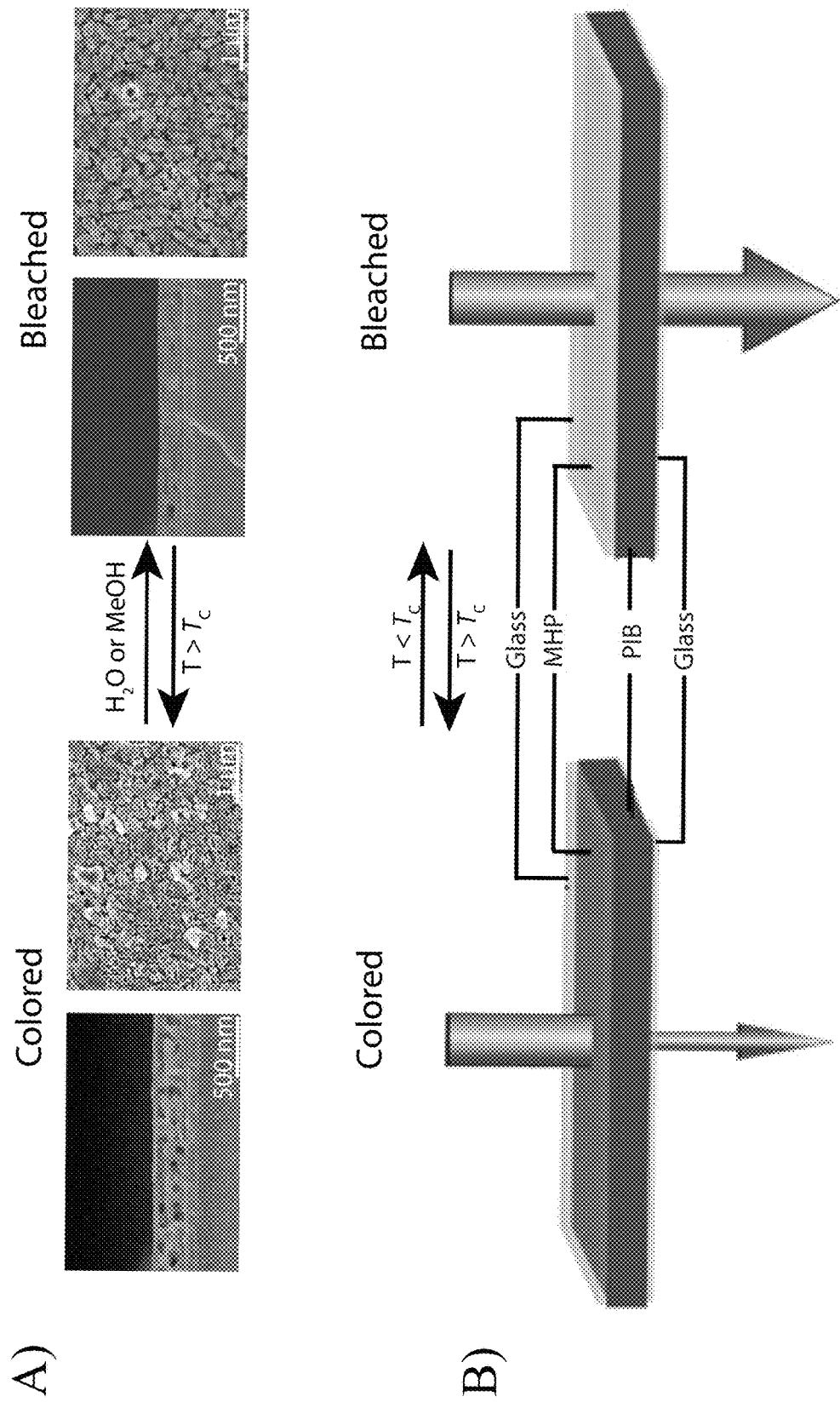
FIG. 9A illustrates aspects of the present invention, according to some embodiments of the present disclosure: Panel A) illustrates a representative scanning electron microscopy (SEM) image of composite perovskite-containing films containing a polymer in the colored and bleached states. Panel B) presents an illustration of thermochromic perovskite-containing smart windows in the colored and bleached states.
Figure 9B:
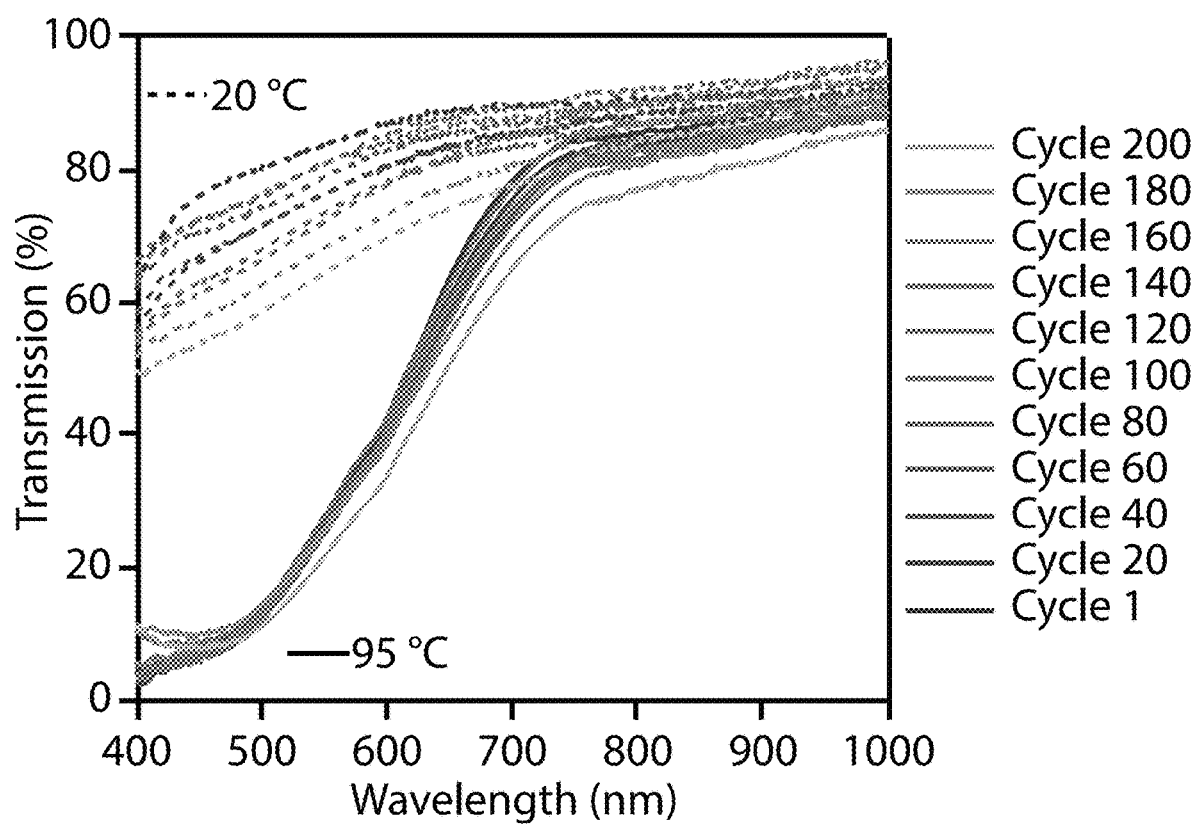
FIG. 9B illustrates transmittance data of over 200 thermochromic switching cycles of alternating exposure to 20° C. and 95° C. for a composite perovskite-containing film containing PAA and using MeOH as the intercalation molecule, according to some embodiments of the present disclosure. Note that 95° C. was chosen to increase the thermochromic switching speed.
Figure 9C:
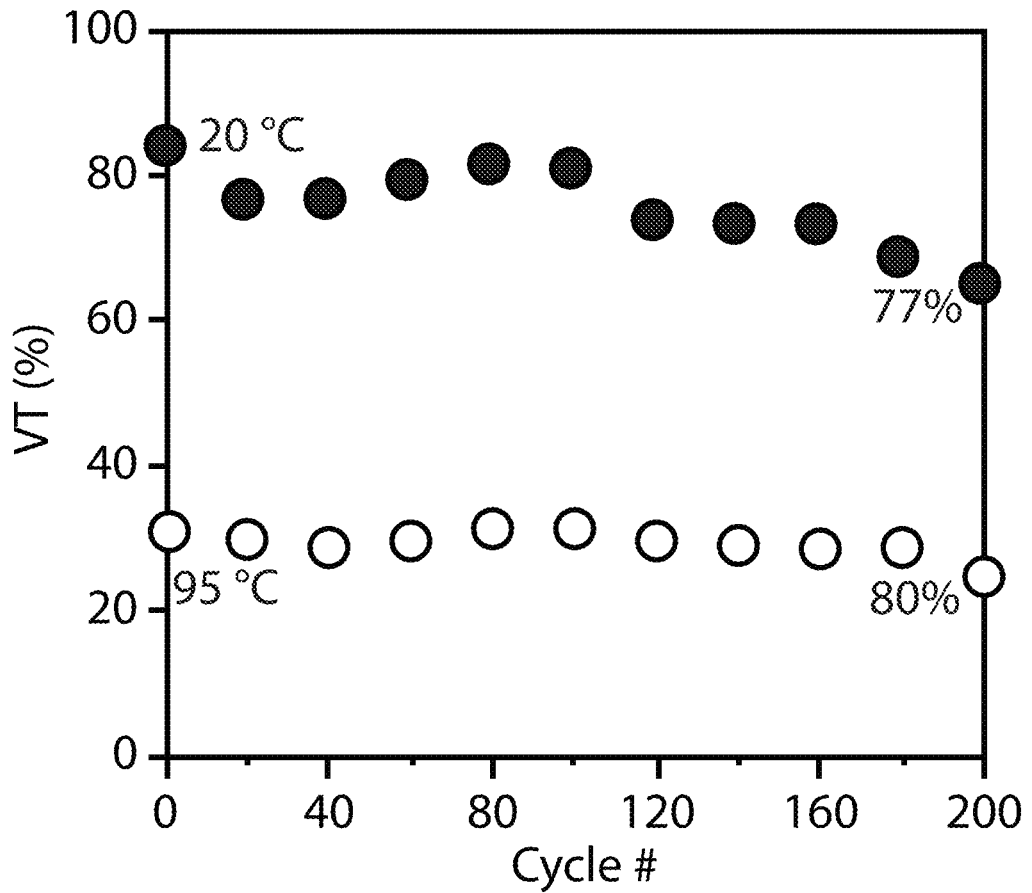
FIG. 9C illustrates visible transmittance (VT) data of over 200 thermochromic switching cycles of alternating exposure to 20° C. and 95° C. for a composite perovskite-containing film containing PAA and using MeOH as the intercalation molecule, according to some embodiments of the present disclosure. Note that 95° C. was chosen to increase the thermochromic switching speed.

In addition, smart windows were fabricated using composite perovskite-containing films containing PAA described herein, by sealing the perovskite-containing film within two pieces of glass containing an atmosphere of N$_2$/MeOH with polyisobutylene (PIB) sealing the edges (see Panel B of FIG. 9A). As shown herein, smart windows with this architecture became colored when heated above $T_C$ and bleached when cooled below $T_C$. The visible light transmittance (VT) of these smart windows cycled between 31% in the colored state and 84% in the bleached state (see FIGS. 9B and 9C). Remarkably, these smart windows also retained 77% of the initial VT in the bleached state and 80% in the colored state over 200 cycles. This result is the most cycles reported in thermochromic perovskite films to date. Windows were placed on a hotplate with the coated glass pane in direct contact with the hotplate to simulate solar and ambient exposure of an outboard pane of an insulating glass unit.

In addition to the experiments described above, the reversible cycling of a perovskite-containing composition as a result of methanolation was also studied (in the absence of a polymer). Among other things, these studies show that MAPbI$_3$ reversibly forms stable complexes with methanol (MeOH), with salt and/or polymer present in the adjacent second phase.

Switchable perovskite films were fabricated by spin-coating a solution of 4:1 MAI:PbI$_2$ in DMF under inert conditions followed by annealing at 100° C. for 10 min (see Experimental section for more details). The visual appearance of initial films was transparent with a reddish-brown color. Exposure of the polymer-free films to H$_2$O or MeOH vapor by bubbling N$_2$ through the respective solvent induced a rapid structural transformation that resulted in a transparent and colorless film. The transformation occurred in less than 5 minutes and decreased with increasing N$_2$ flow rate. The film was then regenerated to the original reddish-brown color by gently heating the films exposed to H$_2$O and MeOH at 70° C. or 50° C., respectively. These observations suggest a complex between the solvent vapor and the perovskite phase is formed that requires a minimum thermal energy threshold for complex dissociation.

Attenuated total reflection Fourier transform infrared (ATR-FTIR) spectroscopy confirmed H$_2$O and MeOH switching molecules were incorporated into the polymer-free perovskite film upon exposure to vapor and removed after heating (see Table 1). As shown herein, only MeOH formed a complex with the switchable perovskite films studied, whereas exposure to EtOH or isopropyl alcohol (IPA) vapor did not result in a color change. Without wishing to be bound by theory, the EtOH and IPA may be too large to fit into the perovskite structure and the H-bonding strength may be too weak to form a complex at standard conditions.

TABLE 1

ATR-FTIR peaks of thermochromic MHP films exposed to MeOH, H$_2$O, and heat.

| Spectrum[a] | Species | Wavenumber (cm$^{-1}$) | Assignment |
|---|---|---|---|
| Initial/ Heated | MAPbI$_3$ + MAI | 905 | C—H rocking |
| | | 989 | C—N stretching |
| | | 1242 | N—H rocking |
| | | 1403 | C—H symmetric bending |
| | | 1470 | N—H symmetric bending |
| | | 1565 | N—H asymmetric bending |
| | | 2900-3250 | C—H/N—H stretching |
| MeOH | MA$_6$PbI$_8$•2MeOH | 1014 | C—O stretching |
| | | 2832 | C—H symmetric stretching |
| | | 2960 | C—H asymmetric stretching |
| | | 3365 | O—H stretching |
| H$_2$O | MA$_4$PbI$_6$•2H$_2$O | 3435 | O—H stretching |

[a]Peaks assignments corresponding to MA, MeOH, and H$_2$O.

Referring again to polymer-free perovskite-containing compositions, the mechanism of color change may be attributed to an equilibrium that exists between 0D complex formation upon exposure to H$_2$O or MeOH (bleached/transparent state) and complex dissociation into 3D MAPbI$_3$ nanocrystals embedded within an excess MAI matrix upon gentle heating (colored/opaque state). Complex formation and dissociation, among other things, may be dictated by H-bond interactions between the vapor molecule and the perovskite phase. The MeOH complex dissociates at lower temperatures (50° C.) than the H$_2$O complex (70° C.), which suggests MeOH forms weaker H-bonds with the perovskite phase than H$_2$O. MeOH typically exhibits weaker H-bonding than H$_2$O because it has one electropositive proton instead of two.

Unlike switchable perovskite-containing films exposed to H$_2$O switching molecules that form the 0D MA$_4$PbI$_6$•2H$_2$O hydrate complex, the weaker H-bonding of MeOH switching molecules causes films to form a 0D MA$_6$PbI$_8$•2MeOH structure that is richer in MAI than the hydrated complex. MA$_6$PbI$_8$•2MeOH was simulated from the crystal structure of PEA$_6$SnBr$_8$•2CCl$_2$H$_2$ (PEA=phenethylammonium) by modifying elemental composition and maintaining the monoclinic Cc space group. The best fit after Rietveld refinement was obtained with a=13.495812 Å, b=7.758366 Å, c=20.429327 Å, α=γ=90°, and β=102.76711°. The structure of the 0D MA$_6$PbI$_8$•2MeOH complex forms sheets of isolated [PbI$_6$]$^{4+}$ octahedra that allow the larger MeOH molecule to occupy the space between sheets whereas the 0D MA$_4$PbI$_6$•2H$_2$O hydrate complex forms an isotropic network of hydrated [PbI$_6$]$^{4+}$ octahedra.

Figure 11:
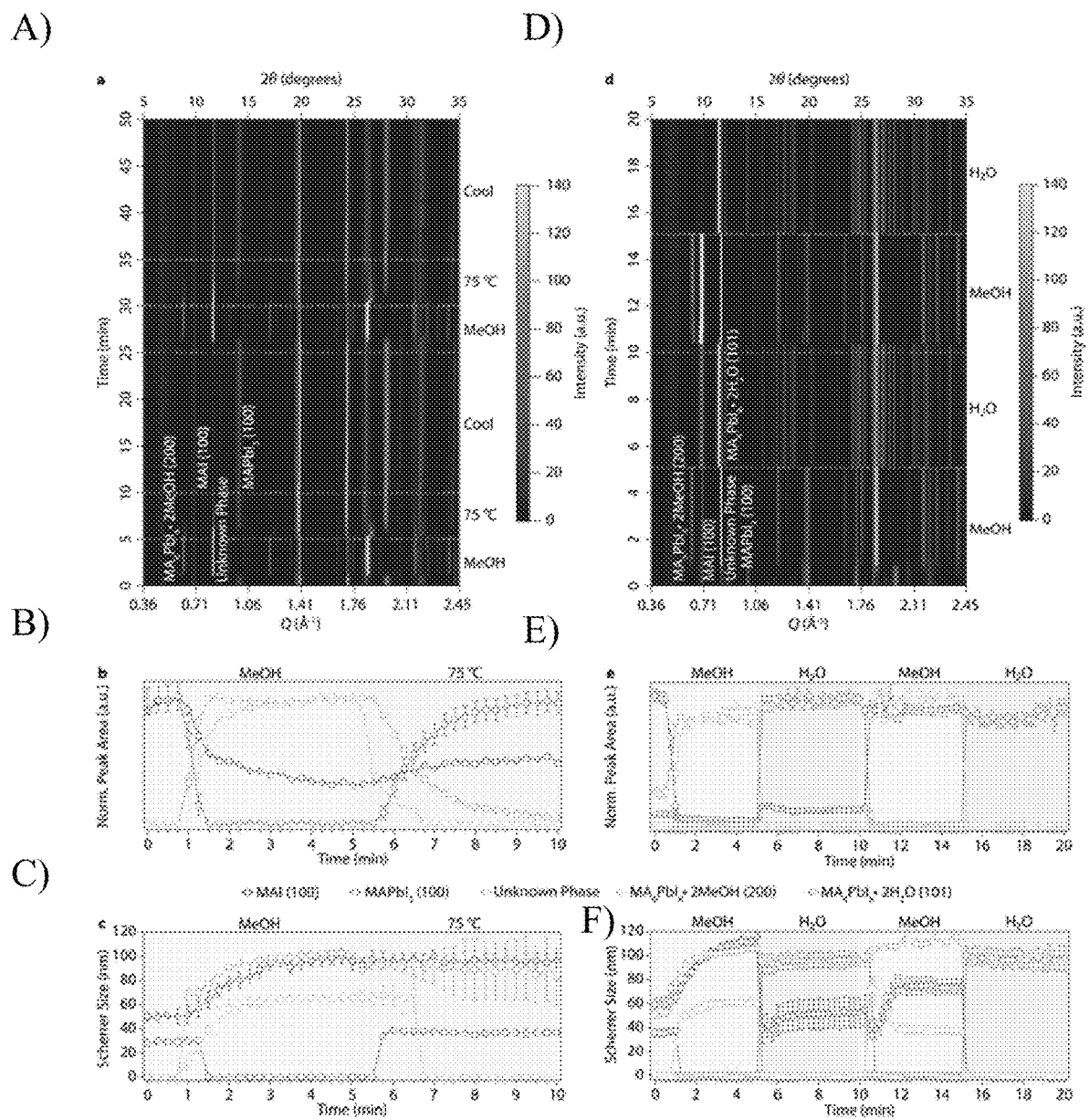
FIG. 11 illustrates aspects of the present invention, according to some embodiments of the present disclosure: In-situ wide-angle X-ray scattering (WAXS) data collected on a switchable MHP film prepared with 4:1 MAI:PbI$_2$. Panel A) Two cycles of alternating exposure to MeOH vapor and 75° C. Comparison of MAI (100), MAPbI$_3$ (100), a "third" phase, and MA$_6$PbI$_8$·2MeOH (200) peak area Panel B) and Scherrer size Panel C) over one cycle of exposure to MeOH and 75° C. in Panel A). Panel C) Two cycles of alternating exposure to MeOH and H$_2$O vapor at room temperature. Comparison of MAI (100), MAPbI$_3$ (100), a "third" phase, MA$_6$PbI$_8$·2MeOH (200), and MA$_4$PbI$_6$·2H$_2$O (101) peak area Panel C) and Scherrer size Panel F) over two cycles of alternating exposure to MeOH and H$_2$O vapor in Panel C. The 2θ axes are relative to Cu Kα (1.5406 Å, 8.04 eV) radiation and were calculated from Q=4π sin(θ)/λ where is the excitation wavelength. Fits and standard deviation error bars in Panels B, C, E, and F) were obtained by fitting peaks in Panels A and C) to a Voigt function.

The 0D methanolated perovskite structure was identified using in-situ wide angle X-ray scattering (WAXS). Reddish-brown films show expected Bragg diffraction peaks that correspond to a mixture of 3D MAPbI$_3$ (first phase) and MAI (second phase) (see Panel A) of FIG. 11). All 3D MAPbI$_3$ peaks disappeared, and MAI peaks decreased in intensity over the course of about 90 seconds after exposing the film to MeOH vapor by flowing He through an MeOH bubbler. New peaks emerged that correspond to 0D MA$_6$PbI$_8$•2MeOH, which appeared between about 45 seconds and about 60 seconds and gain scattering intensity until about 2 minutes and 45 seconds, which correspond to the compositions first perovskite-containing phase. Diffraction peaks from a third phase, positioned within the first phase, associated with methanolation also emerged between about 45 seconds and about 60 seconds, but growth occurred faster with maximum scattering intensity occurring after about 1 minute and 30 seconds.

Annealing the film above 50° C. initiated complex dissociation: first by the disappearance of XRD peaks associated with 0D MA$_4$PbI$_6$•2MeOH and third phase over the first 5 minutes, which correlates to the conversion of the first phase in the 0D crystalline structure and the third phase, back to the first phase in the 3D crystalline structure. The 3D MAPbI$_3$ peaks simultaneously reemerged over about 2 minutes and 45 seconds. Scherrer analysis performed on the (100) peak of 3D MAPbI$_3$ indicates the single crystalline domain size was maintained with values of 36±3 nm before complex formation and 37±4 nm after complex dissociation (see Panel C) of FIG. 11). The Scherrer size of 0D MA$_6$PbI$_8$•2MeOH and the third phase is larger than the 3D MAPbI$_3$ phase, which suggests that larger domains were formed when the adjacent MAI phase was incorporated into the 3D MAPbI$_3$ domains. Formation of the third phase before 0D MA$_6$PbI$_8$•2MeOH and dissociation of the third phase after 0D MA$_6$PbI$_8$•2MeOH suggests that the third phase is likely a structural intermediate between 3D MAPbI$_3$ and 0D MA$_6$PbI$_8$•2MeOH that stabilizes the 0D MA$_6$PbI$_8$•2MeOH structure and balances the stoichiometry of the excess MAI.

Attempts were made to identify the third phase. The intensity and FWMH evolution of the unknown peaks suggest it is a single phase independent from 0D MA$_6$PbI$_8$•2MeOH (see Panels B) and C) of FIG. 11). The methanolated composite perovskite-containing composition also contains peaks corresponding to crystalline MAI, which suggests the third phase does not form in a 1:1 ratio and is likely poorer in MAI and richer in $PbI_2$ relative to the 0D $MA_6PbI_8 \cdot 2MeOH$ phase. The 1D diffraction patterns were fit to various known polymorphs of low-dimensional MHP phases such as $APb_2I_5$, $A_2PbI_4$, $A_3PbI_5$, and $A_4PbI_6$ with and without intercalating molecules.

Switchable MHP films were readily interconverted between methanolated and hydrated complexes by changing the chemical potential of the system through Le Chatelier's Principle. In-situ WAXS shows that exposing a methanolated film to $H_2O$ vapor initiated a rapid transformation from a 0D $MA_6PbI_8 \cdot 2MeOH$ perovskite phase and the third phase associated with methanolation to a 0D $MA_4PbI_6 \cdot 2H_2O$ perovskite phase in under 15 seconds (see Panels D) and E) of FIG. 11). This transformation was reversed at a slightly slower rate of 30 seconds by exposing the hydrated film to MeOH vapor. The rapid conversion between methanolated and hydrated films (<30 seconds) relative to the process of methanolating or hydrating a colored film containing a 3D $MAPbI_3$ perovskite phase and $MAI^-$ containing second phase (>1 minute) suggests that exchanging $MeOH/H_2O$ has a smaller thermodynamic driving force than intercalating $MeOH/H_2O$ because the $[PbI_6]^{4+}$ octahedra in the perovskite phase are already separated.

Figure 12:
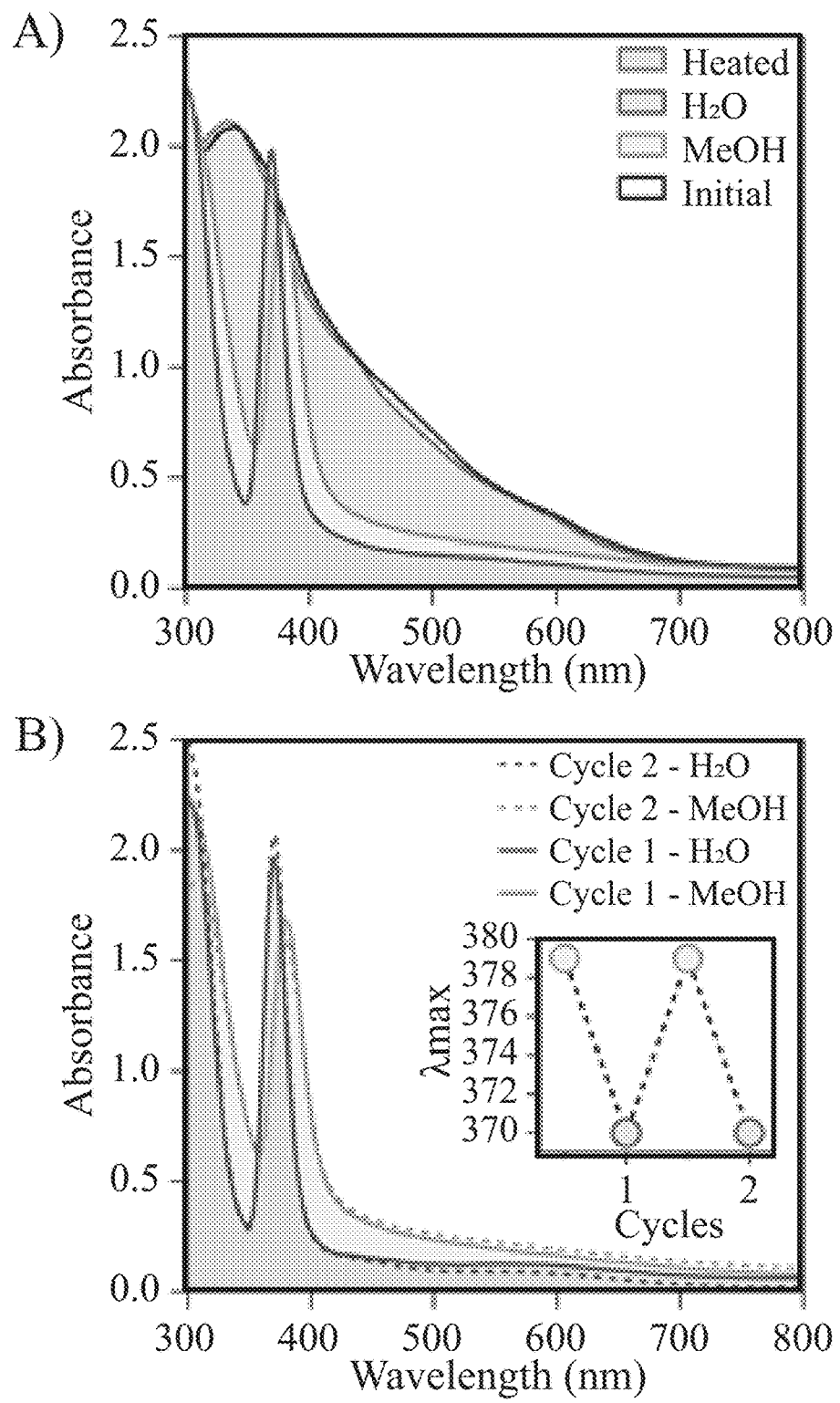
FIG. 12 illustrates a typical absorption of the same switchable MHP film exposed to Panel A) MeOH, H$_2$O, and heat and Panel B) two cycles of alternating exposure to MeOH and H$_2$O, according to some embodiments of the present disclosure. Inset in Panel B) shows the excitonic peak (max) during cycling.
Figure 13A:
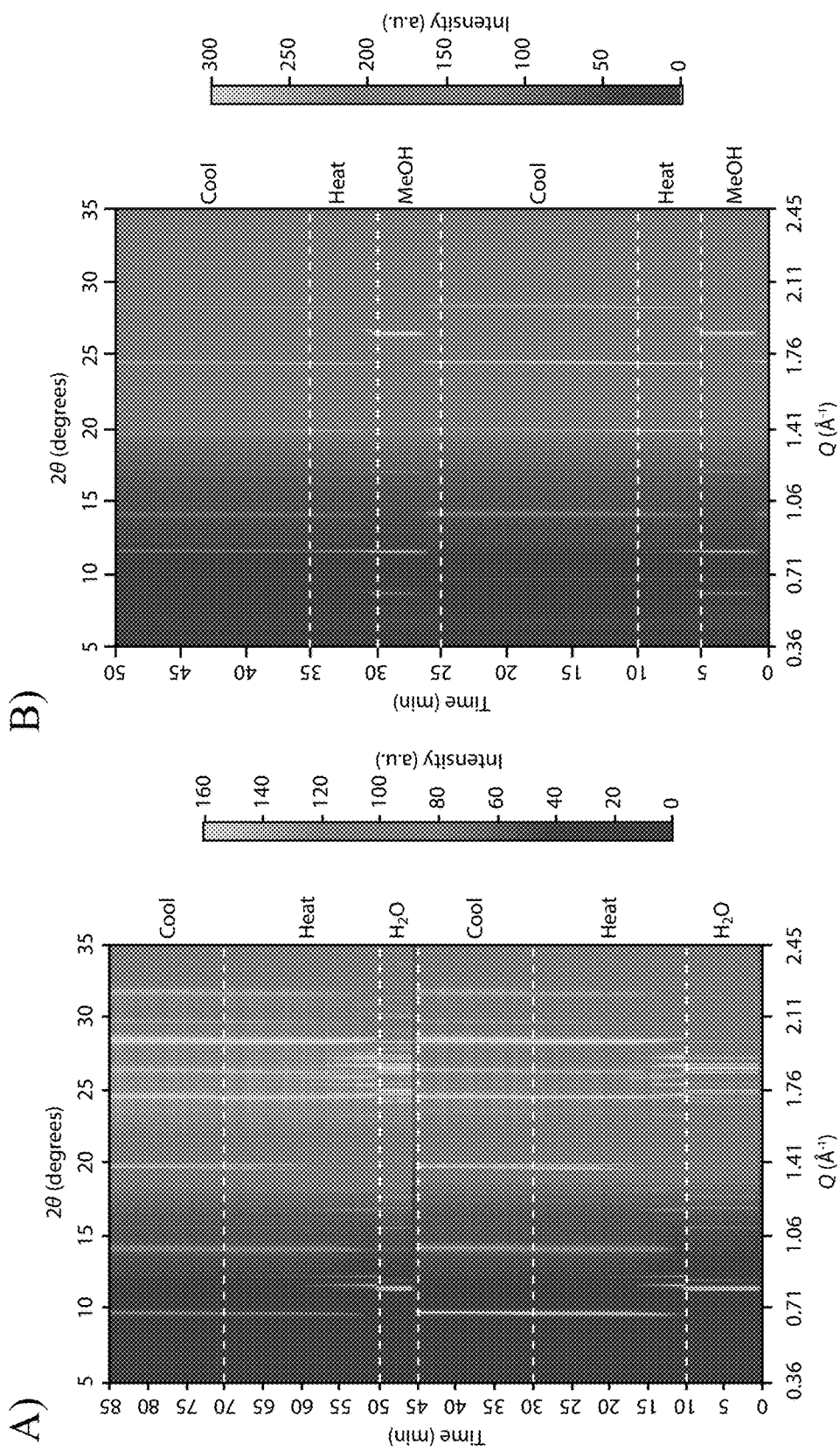
FIG. 13A illustrates In-situ wide-angle X-ray scattering (WAXS) data collected on a composite perovskite-containing film without polymer incorporation over two cycles of exposure to Panel A) H$_2$O and Panel B) MeOH followed by heating to 75° C. and then cooling to 30° C., according to some embodiments of the present disclosure. The 2θ axes are relative to Cu Kα (1.5406 Å, 8.04 eV) radiation and was calculated from Q=4π sin(θ)/λ where is the excitation wavelength.
Figure 13B:
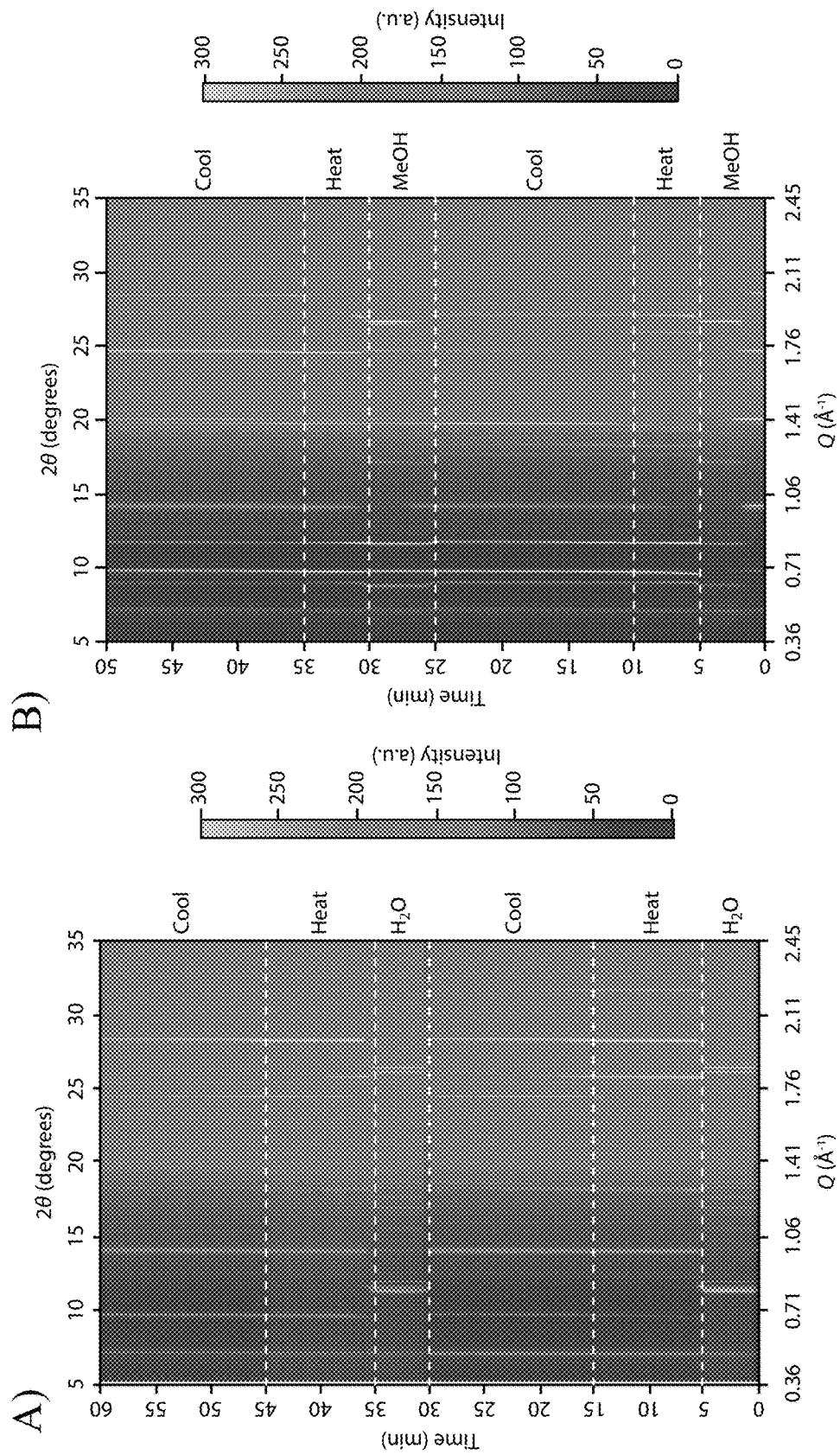
FIG. 13B illustrates In-situ wide-angle X-ray scattering (WAXS) data collected on a composite perovskite-containing film containing PEG over two cycles of exposure to Panel A) H$_2$O and Panel B) MeOH followed by heating to 75° C. and then cooling to 30° C., according to some embodiments of the present disclosure. The 2θ axes are relative to Cu Kα (1.5406 Å, 8.04 eV) radiation and was calculated from Q=4π sin(θ)/λ where is the excitation wavelength.
Figure 13C:
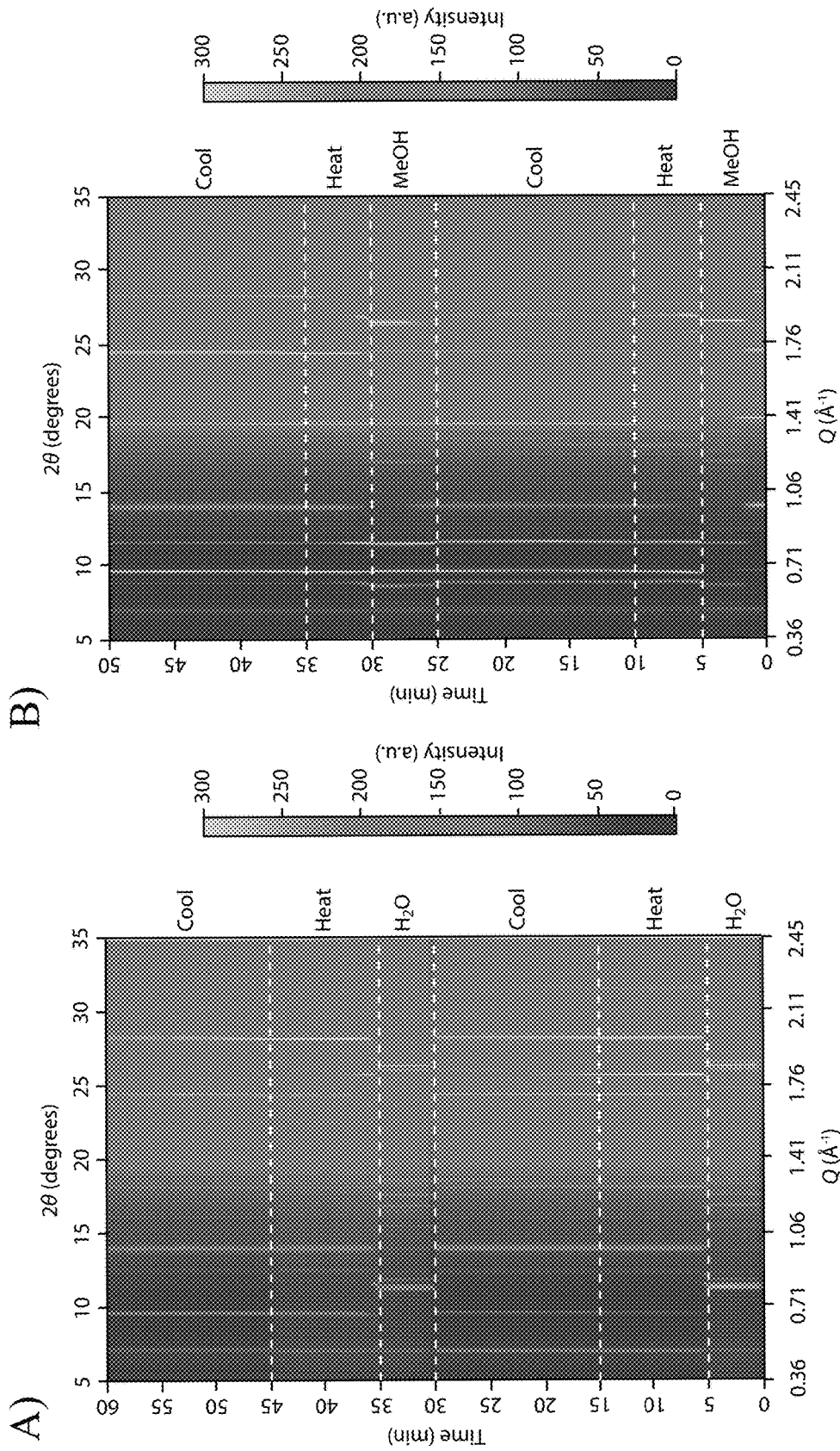
FIG. 13C illustrates In-situ wide-angle X-ray scattering (WAXS) data collected on a composite perovskite-containing film containing PVA over two cycles of exposure to Panel A) H$_2$O and Panel B) MeOH followed by heating to 75° C. and then cooling to 30° C., according to some embodiments of the present disclosure. The 2θ axes are relative to Cu Kα (1.5406 Å, 8.04 eV) radiation and was calculated from Q=4π sin(θ)/λ where is the excitation wavelength.
Figure 13D:
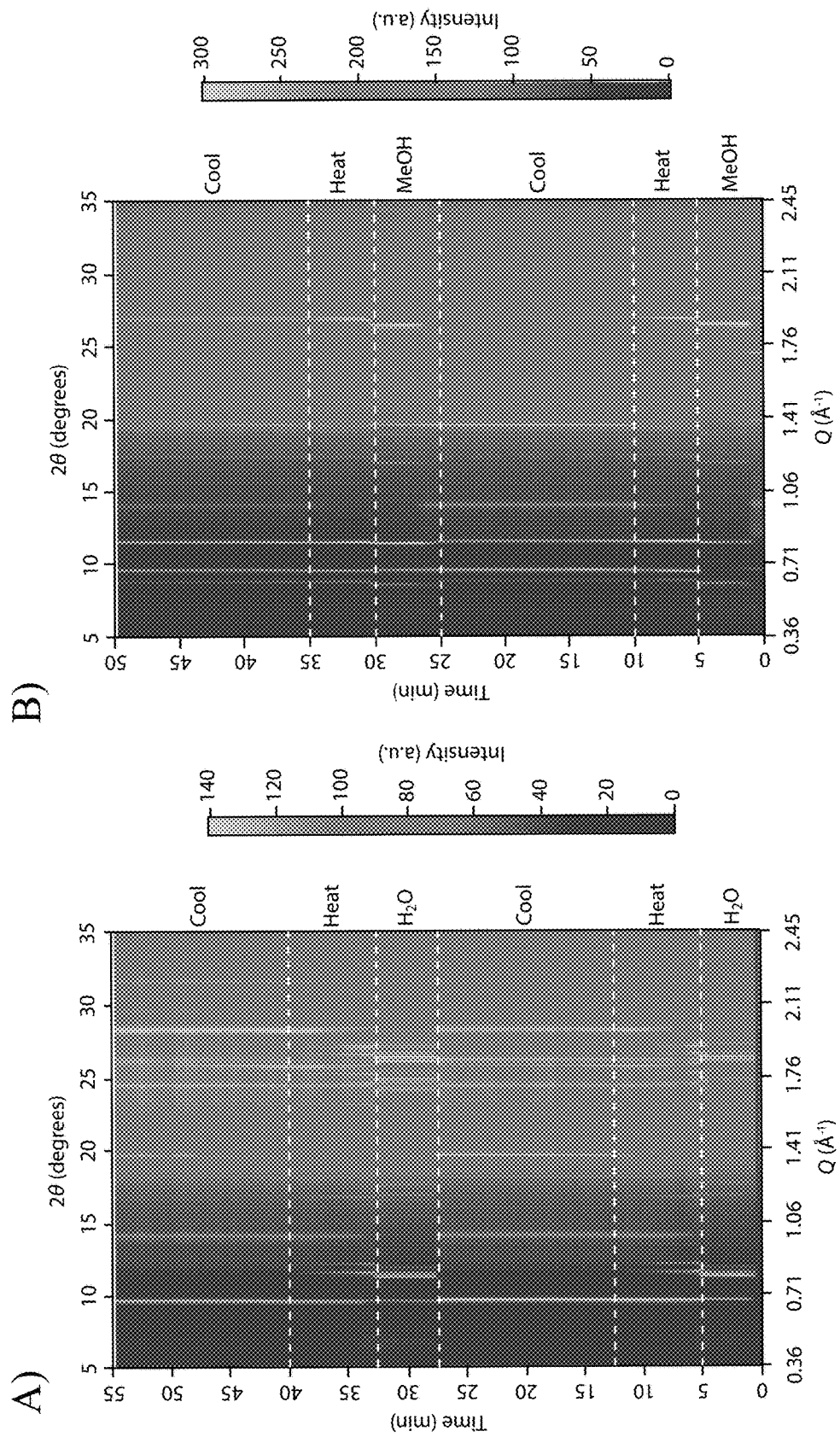
FIG. 13D illustrates In-situ wide-angle X-ray scattering (WAXS) data collected on a composite perovskite-containing film containing PAA over two cycles of exposure to Panel A) H$_2$O and Panel B) MeOH followed by heating to 75° C. and then cooling to 30° C., according to some embodiments of the present disclosure. The 2θ axes are relative to Cu Kα (1.5406 Å, 8.04 eV) radiation and was calculated from Q=4π sin(θ)/λ where is the excitation wavelength.
Figure 13E:
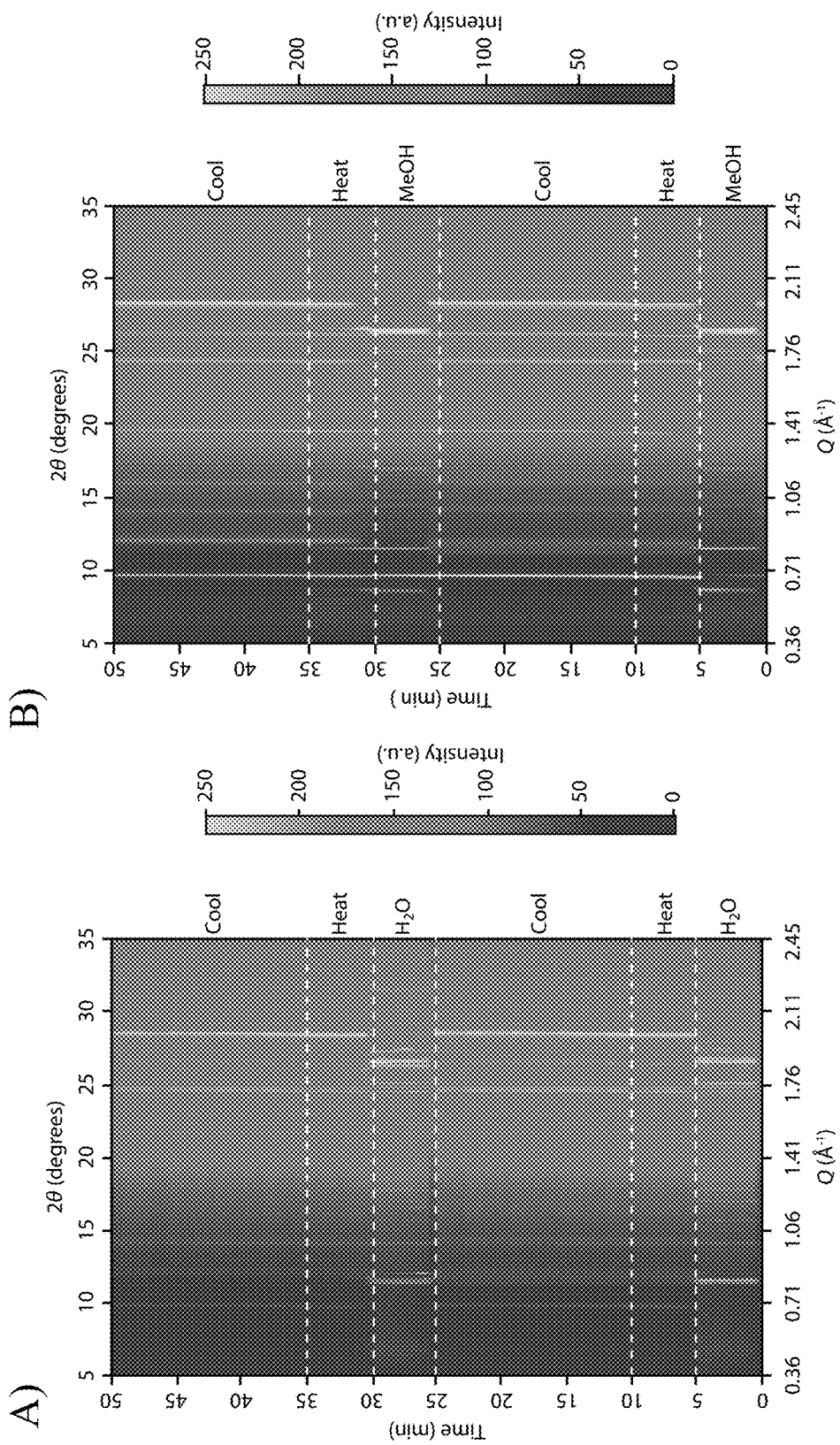
FIG. 13E illustrates In-situ wide-angle X-ray scattering (WAXS) data collected on a composite perovskite-containing film containing excess MAI salt and MACl dopant over two cycles of exposure to Panel A) H$_2$O and Panel B) MeOH followed by heating to 75° C. and then cooling to 30° C., according to some embodiments of the present disclosure. The 2θ axes are relative to Cu Kα (1.5406 Å, 8.04 eV) radiation and was calculated from Q=4π sin(θ)/λ where is the excitation wavelength.
Figure 13F:
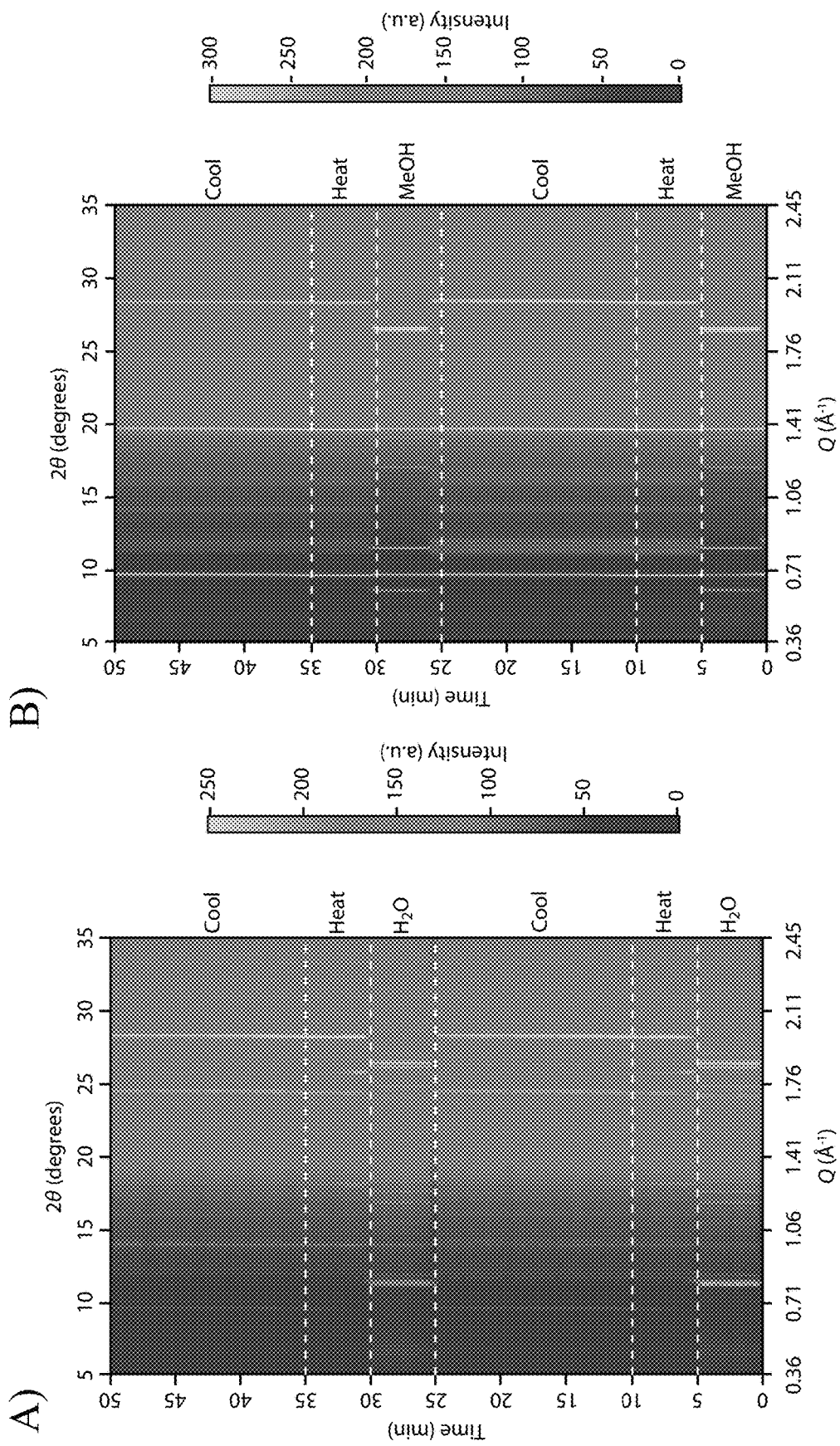
FIG. 13F illustrates In-situ wide-angle X-ray scattering (WAXS) data collected on a composite perovskite-containing film containing excess MAI salt, MACl dopant, and PAA over two cycles of exposure to Panel A) H$_2$O and Panel B) MeOH followed by heating to 75° C. and then cooling to 30° C., according to some embodiments of the present disclosure. The 2θ axes are relative to Cu Kα (1.5406 Å, 8.04 eV) radiation and was calculated from Q=4π sin(θ)/λ where is the excitation wavelength. Here "excess" refers to any amount of above the stoichiometric amount needed to make the perovskite, in this case, MAPbI$_3$. The ratio of MAI to PbI$_2$ is 1:1. Anything >1:1 (1.5:1, 2:1, 4:1, etc.) is excess. In addition to any excess MAI present in a formulation, it may also be "doped" with additional MACl.

The structural transformations between 3D and 0D perovskite phases were accompanied by reversible optical coloration and bleaching (corresponding to the terms opaque and transparent, respectively). Optical absorption measurements show that the initial switchable perovskite-containing films exhibit strong absorbance in the visible region with a VT of 38% and a band gap of 1.80 eV (see Panel A) of FIG. 12), which is larger than the typical 1.57 eV band gap observed for $MAPbI_3$. The larger band gap is likely caused by surface strain on 3D $MAPbI_3$ nanocrystals embedded within a MAI second phase. Exposure of the initial switchable perovskite-containing film to MeOH or $H_2O$ induced a structural transformation from 3D to 0D that resulted in optical bleaching of the film in the visible region with VT increasing to 64% and 75%, respectively, along with the emergence of a strong excitonic peak at 379 and 370 nm, respectively. Heating the methanolated film above 50° C. and the hydrated film above 70° C. initiated complex dissociation from 0D to 3D resulting in the re-emergence of the 1.80 eV band gap and absorbance in the visible region.

The excitonic absorption peaks are due to absorption of the isolated $[PbI_6]^{4+}$ octahedra that are formed when $H_2O$ and MeOH intercalate into the 3D $MAPbI_3$ perovskite phase. $H_2O$ and MeOH are readily exchanged to reversibly transform the film from the hydrated to the methanolated phases, which is accompanied by a shift in the peak absorbance ($\lambda_{max}$) from 379 nm to 370 nm and a decreased baseline (see Panel B) of FIG. 12). The energy of the $[PbI_6]^{4+}$ excitonic peak increases with more isolation and decreases with less isolation. The methanolated film has a lower energy excitation peak compared to the hydrated film because $[PbI_6]^{4+}$ octahedra are less isolated. The structure of the 0D $MA_6PbI_8 \cdot 2MeOH$ perovskite phase contains sheets of closely packed octahedra that are separated by only MAI whereas the sheets are separated by both MeOH and MAI in the orthogonal direction. In contrast, the structure of 0D $MA_4PbI_6 \cdot 2H_2O$ perovskite phase contains an isotropic 3D network of isolated octahedra that are separated by both MAI and $H_2O$ leading to increased separation of isolated octahedra. The methanolated films also exhibited increased absorbance at wavelengths lower than 550 nm compared to hydrated films (see FIG. 12), which may be attributed to formation of the third phase.

In conclusion, we show that perovskites form 0D complexes with MeOH. 0D complex formation is driven by H-bonding between MeOH and the perovskite phase. MeOH within the 0D perovskite phase is reversibly exchanged for $H_2O$ at room temperature upon exposure to excess vapor, which induces a change in the chemical potential of the system through Le Chatelier's Principle. The 0D complex can be dissociated to regenerate the 3D perovskite structure by removing MeOH through mild heating above 50° C. These results demonstrate a new intercalation complex formed between perovskites and MeOH that has a lower switching temperature compared to $H_2O$ analogues enabling next-generation stimuli-responsive switchable perovskite applications.

EXAMPLES

Example 1. A composition comprising: a first phase comprising a perovskite; and a second phase comprising a salt, a polymer, and a switching molecule, wherein: the first phase and the second phase are in physical contact, the composition is capable of reversibly switching between a substantially opaque state and a substantially transparent state, when in the opaque state, the perovskite is an opaque perovskite comprising a three-dimensional (3D) perovskite, when in the transparent state, the perovskite is a transparent perovskite comprising a zero-dimensional (0D) perovskite that is in a complex with the switching molecule, and the first phase switches between the opaque state and transparent state when the composition transitions through a critical temperature, $T_c$, between about 20° C. and about 95° C.

Example 2. The composition of Example 1, wherein $T_c$ is between about 20° C. and about 75° C.

Example 3. The composition of Example 2, wherein $T_c$ is between about 20° C. and about 25° C.

Example 4. The composition of Example 1, wherein the switching molecule comprises at least one of water, methanol, ethanol, propanol, or butanol.

Example 5. The composition of Example 1, wherein the switching molecule comprises at least one of water or methanol.

Example 6. The composition of Example 1, wherein: the opaque perovskite comprises $ABX_3$, and A comprises a first cation, B comprises a second cation, and X comprises a first anion.

Example 7. The composition of Example 1, wherein: the transparent perovskite comprises A, B, and X at a ratio of AX to BX that is greater than 1.0.

Example 8. The composition of Example 6, wherein the transparent perovskite comprises at least one of $A_6BX_8$ or $A_4BX_6$.

Example 9. The composition of Example 8, wherein the transparent perovskite further comprises at least one of $A_6BX_8 \cdot 2MeOH$ or $A_4BX_6 \cdot 2H_2O$.

Example 10. The composition of Example 6, wherein A comprises at least one of methyl ammonium, formamidinium, or cesium.

Example 11. The composition of Example 6, wherein B comprises at least one of lead, tin, germanium, or a transition metal.

Example 12. The composition of Example 6, wherein X comprises a halide.

Example 13. The composition of Example 1, wherein: the salt comprises at least one of AX or AX', and X' comprises a second anion.

Example 14. The composition of Example 1, wherein the polymer comprises carbon, hydrogen, and oxygen.

Example 15. The composition of Example 14, wherein the polymer comprises at least one of an ether linkage, a ketone linkage, an amide linkage, a hydroxyl group, or a carboxylic acid group.

Example 16. The composition of Example 15, wherein the polymer comprises at least one of poly(ethylene glycol) (PEG), poly(vinyl alcohol) (PVA), polyacrylic acid (PAA), or polyethyleneimine.

Example 17. The composition of Example 1, wherein the polymer is present at a concentration between about 0.1 wt % and about 50 wt % relative to the transparent perovskite.

Example 18. The composition of Example 1, further comprising a plurality of pores that are present within the first phase in the opaque state and substantially absent in the translucent state.

Example 19. The composition of Example 18, where the pores are present at a concentration between about 0.1 vol % and about 70 vol % relative to the opaque perovskite.

Example 20. The composition of Example 18, wherein: the perovskite comprises a plurality of grains separated by a plurality of grain boundaries, at least a portion of the polymer is positioned at least one of adjacent to the pores or within the pores while in the opaque state, and at least a portion of the polymer is positioned at least one of adjacent to the grain boundaries or within the grain boundaries while in the transparent state.

Example 21. The composition of Example 20, wherein each grain has a characteristic length between about 1 nm and about 10,000 nm.

Example 22. The composition of Example 1, wherein the polymer forms a non-covalent bond with the opaque perovskite, and the polymer forms a non-covalent bond with the switching molecule while in the transparent state.

Example 23. The composition of Example 22, wherein the polymer forms a non-covalent bond with the salt.

Example 24. The composition of Example 1, wherein the salt forms a non-covalent bond with the opaque perovskite.

Example 25. The composition of Example 13, wherein the salt provides at least one of X' or excess of X.

Example 26. The composition of Example 25, wherein the at least one of X' or excess of X is present at a concentration between about 1 mol % and about 1000 mol % relative to the halide present in $ABX_3$.

Example 27. The composition of Example 25, further comprising a third cation that charge balances the at least one of X' or excess of X.

Example 28. The composition of Example 27, wherein the third cation comprises at least one of methyl ammonium (MA), formamidinium (FA), or cesium.

Example 29. The composition of Example 6, wherein the opaque perovskite comprises $MAPbI_3$.

Example 30. The composition of Example 8, wherein the transparent perovskite comprises at least one of $MA_6PbI_8$ or $MA_4PbI_6$.

Example 31. The composition of Example 30, wherein the transparent perovskite further comprises at least one of $MA_6PbI_8 \cdot 2MeOH$ or $MA_4PbI_6 \cdot 2H_2O$.

Example 32. The composition of Example 13, wherein the salt comprises at least one of MAX, MAX', FAX, FAX', CsX, or CsX'.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composition comprising:
   a first phase comprising at least one of a three-dimensional (3D) perovskite or a zero-dimensional (0D) perovskite; and
   a second phase comprising a switching molecule, wherein:
   the first phase and the second phase are in physical contact,
   the composition is capable of reversibly switching between a substantially opaque state and a substantially transparent state,
   when in the opaque state, the first phase comprises a plurality of pores and the 3D perovskite comprising $ABX_3$,
   when in the transparent state, the first phase comprises the switching molecule and the 0D perovskite comprising at least one of $A_6BX_8$ or $A_4BX_6$,
   A comprises a first cation,
   B comprises a second cation,
   X comprises a first anion, and
   the composition is capable of switching between the opaque state and transparent state when the composition transitions through acritical temperature, $T_c$, between 20° C. and 95° C.

2. The composition of claim 1, wherein $T_c$ is between 20° C. and 75° C.

3. The composition of claim 2, where $T_c$ is between 20° C. and 25° C.

4. The composition of claim 1, wherein the switching molecule comprises at least one of water, methanol, ethanol, propanol, or butanol.

5. The composition of claim 1, wherein the switching molecule comprises at least one of water or methanol.

6. The composition of claim 5, wherein when in the transparent state, the first phase comprises at least one of $A_6BX_8 \cdot 2MeOH$ or $A_4BX_6 \cdot 2H_2O$.

7. The composition of claim 1, wherein the 0D perovskite comprises AX to BX at a ratio that is greater than 1.0.

8. The composition of claim 1, wherein A comprises at least one of methyl ammonium, formamidinium, or cesium.

9. The composition of claim 1, wherein B comprises at least one of lead, tin, germanium, or a transition metal.

10. The composition of claim 1, wherein X comprises a halide.

11. The composition of claim 1, wherein: the salt comprises at least one of AX or AX', and X' comprises a second anion.

12. The composition of claim 11, wherein X' comprises at least one of chloride or iodide.

13. The composition of claim 1, wherein the second phase further comprises a polymer.

14. The composition of claim 13, wherein the polymer comprises carbon, hydrogen, and oxygen.

15. The composition of claim 14, wherein the polymer comprises at least one of an ether linkage, a ketone linkage, an amide linkage, a hydroxyl group, or a carboxylic acid group.

16. The composition of claim 15, wherein the polymer comprises at least one of poly(ethylene glycol) (PEG), poly(vinyl alcohol) (PVA), polyacrylic acid (PAA), or polyethyleneimine.

17. The composition of claim 1, wherein the polymer is present at a concentration between about 0.1 wt % and about 50 wt % relative to the 0D perovskite.

18. The composition of claim 1, wherein the pores are present at a concentration between about 0.1 vol % and about 70 vol % relative to the 3D perovskite.

19. The composition of claim 1, wherein the perovskite comprises a plurality of grains separated by a plurality of grain boundaries, at least a portion of the polymer is positioned at least one of adjacent to the pores or within the pores while in the opaque state, and at least a portion of the polymer is positioned at least one of adjacent to the grain boundaries or within the grain boundaries while in the transparent state.

20. The composition of claim 1, wherein the 3D perovskite comprises $MAPbI_3$, and MA is methylammonium.

21. The composition of claim 1, wherein the 0D perovskite comprises at least one of $MA_6PbI_8$ or $MA_4PbI_6$, and MA is methylammonium.

22. The composition of claim 21, wherein when in the transparent state, the first phase comprises at least one of $MA_6PbI_8 \cdot 2MeOH$ or $MA_4PbI_6 \cdot 2H_2O$.

23. The composition of claim 1, wherein the second phase further comprises a salt.

24. The composition of claim 23, wherein the salt comprises at least one of MAX, MAX', FAX, FAX', CsX, or CsX', MA is methylammonium, and FA is formamidinium.

* * * * *